US012790881B2

(12) United States Patent
Campbell et al.

(10) Patent No.: US 12,790,881 B2
(45) Date of Patent: Nov. 10, 2026

(54) WINDOW OPERATOR ASSEMBLIES AND DEVICES FOR CONTROLLING THE SAME

(71) Applicant: QuB LLC, Lake Elmo, MN (US)

(72) Inventors: Frank W. Campbell, Tucson, AZ (US); John J. Micinski, Belvidere, IL (US); Loren Horsager, Rochester, MN (US); Graham Spall, Plymouth, MN (US)

(73) Assignee: QuB LLC, Lake Elmo, MN (US)

( * ) Notice: Subject to any disclaimer, the term of this patent is extended or adjusted under 35 U.S.C. 154(b) by 0 days.

(21) Appl. No.: 18/120,066

(22) Filed: Mar. 10, 2023

(65) Prior Publication Data

US 2023/0287727 A1 Sep. 14, 2023

Related U.S. Application Data

(60) Provisional application No. 63/319,242, filed on Mar. 11, 2022.

(51) Int. Cl.

*E05F 15/77* (2015.01)
*E05B 47/00* (2006.01)
*E05F 15/41* (2015.01)
*E05F 15/71* (2015.01)

(52) U.S. Cl.

CPC .............. *E05F 15/77* (2015.01); *E05B 47/00* (2013.01); *E05F 15/41* (2015.01); *E05F 15/71* (2015.01); *E05B 2047/0076* (2013.01); *E05Y 2400/514* (2013.01); *E05Y 2400/66* (2013.01); *E05Y 2400/80* (2013.01); *E05Y 2400/8505* (2024.05); *E05Y 2400/851* (2024.05); *E05Y 2400/8515* (2024.05); *E05Y 2900/148* (2013.01)

(58) Field of Classification Search

CPC E05F 15/77; E05F 15/41; E05F 15/71; E05B 47/00; E05B 2047/0076; E05Y 2400/514; E05Y 2400/66; E05Y 2900/148

See application file for complete search history.

(56) References Cited

U.S. PATENT DOCUMENTS 9,689,190 B2 * 6/2017 Wu ........................ G08B 13/08
11,002,057 B1 5/2021 Micinski et al.
11,719,037 B2 8/2023 Farnes et al.
(Continued)

OTHER PUBLICATIONS

English Translation of CN 110242185 (Year: 2019).*
English Translation of CN 205277137 (Year: 2016).*
English Translation of JPH 08199907 (Year: 1996).*

*Primary Examiner* — Patrick N Edouard
*Assistant Examiner* — Eboni N Giles
(74) *Attorney, Agent, or Firm* — Dicke, Billig & Czaja, PLLC

(57) ABSTRACT

An example window operator assembly comprises a motor, communication circuitry, and processor circuitry. The communication circuitry being configured to provide a first type of wireless communications and a second type of wireless communication with a first wireless communication system and a second wireless communication system. And, the processor circuitry being configured to identify connection loss between the communication circuitry and the first wireless communication system, and in response, cause the communication circuitry to switch to the second wireless communication system and cause the window operator assembly to perform an action.

23 Claims, 11 Drawing Sheets

(56) References Cited

U.S. PATENT DOCUMENTS

| | | | | |
|---|---|---|---|---|
| 2015/0077832 | A1* | 3/2015 | Berland | E06B 9/24<br>359/275 |
| 2017/0223808 | A1* | 8/2017 | Barna | H04L 12/2829 |
| 2019/0003236 | A1* | 1/2019 | Hall | E05F 15/635 |
| 2019/0234110 | A1* | 8/2019 | Laporta | E05B 9/08 |
| 2019/0353972 | A1* | 11/2019 | Shrivastava | G05B 15/02 |
| 2021/0075637 | A1* | 3/2021 | Madonna | H04L 12/282 |
| 2022/0341259 | A1* | 10/2022 | Chacon | E06B 9/42 |
| 2023/0250685 | A1 | 8/2023 | Curtis et al. | |
| 2023/0305353 | A1* | 9/2023 | Shrivastava | E06B 3/6722 |
| 2024/0192397 | A1* | 6/2024 | Derham | E05B 65/08 |

* cited by examiner

WINDOW OPERATOR ASSEMBLIES AND DEVICES FOR CONTROLLING THE SAME

BACKGROUND

Many casement window operating assemblies utilize a rotary actuator that may be used to open or close a window sash. The actuator is typically in the form of a hand crank adapted to be turned in one direction to open the sash and in an opposite direction to close the sash. There are also instances where the actuator is operable by an electric motor.

There have been many types of actuators that have been utilized in the past. However, there has always been room for improvement and changes over control of window operating assemblies. Smart home integration is a new technology for residential and commercial building industry. Residential window manufacturers would like to participate in this new technology. However, there are no window hardware suppliers that have been able to address this new technology.

For the reasons stated above and for other reasons stated below, which will become apparent to those skilled in the art upon reading and understanding the present specification, there is a need in the art for an improved window operating system.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

This invention relates generally to a window operator assembly, devices, and systems for controlling the window operator assembly to operate.

In some aspects, a window operator assembly comprising a motor and communication circuitry configured to provide a first type of wireless communications and a second type of wireless communication with a first wireless communication system and a second wireless communication system. The window operator assembly further comprises processor circuitry configured to identify connection loss between the communication circuitry and the first wireless communication system, and in response, cause the communication circuitry to switch to the second wireless communication system and cause the window operator assembly to perform an action.

In some aspects, the action includes at least one of activate the motor to move a window connected to the window operator assembly to a closed position, lock the window in the closed position, communicate a message, via the communication circuitry and using the second type of wireless communications, to a wireless communication device, the message being indicative of the connection loss, and verify an approved wireless communication device is connected to the second wireless communication system and is within a threshold range of the window operator assembly.

In some aspects, the first type of wireless communication is associated with a longer range than the second type of wireless communication.

In some aspects, the processor circuitry is configured to encrypt the first type and the second type of wireless communications.

In some aspects, the window operator assembly further includes a window identifier (ID) that identifies the window operator assembly and a window connected to the window operator assembly.

In some aspects, the processor circuitry is configured to cause the communication circuitry to switch to the second wireless communication system and to connect to a third wireless communication system associated with the first type of wireless communication.

In some aspects, the processor circuitry is configured to activate the motor to move the window to a position and at a set speed based on communication from a computing device. In various aspects, the processor circuitry is configured control the set speed based on a pulse width modulation (PWM) of the motor.

In some aspects, the processor circuitry is configured to provide motor movement at a constant speed based on feedback data from a motor encoder coupled to the motor.

In some aspects, the window operator assembly further includes a pressure sensor in communication with the processor circuitry, wherein the processor circuitry is configured to stop movement of the window in response to a sensor signal from the pressure sensor indicating the movement is slower than a threshold speed.

In some aspects, the window operator assembly further includes a liquid sensor in communication with the processor circuitry, wherein the processor circuitry is configured to close the window in response to a sensor signal from the liquid sensor indicating occurrence of rain.

In some aspects, the window operator assembly further includes a glass break sensor in communication with the processor circuitry, wherein the processor circuitry is configured to communicate an alert in response a sensor signal from the glass break sensor indicating the window is broken.

In some aspects, the window operator assembly further includes a motion sensor in communication with the processor circuitry, wherein the processor circuitry is configured to communicate an alert in response a sensor signal from the motion sensor indicating the window is being manually moved.

In some aspects, the window operator assembly further includes a magnetic sensor in communication with the processor circuitry and a magnet, wherein the processor circuitry is configured to identify the window is unlocked or locked based on sensor signals from the magnetic sensor as the magnetic sensor interacts with the magnet.

In some aspects, the processor circuitry is further configured to initiate a self-zeroing operation associated with a window connected to the window operator assembly.

Some aspects of the present disclosure are directed to non-transitory computer-readable storage medium comprising instructions that when executed cause processor circuitry to: receive a window identifier (ID) associated with a window operator assembly and a building ID associated with a building containing a window connected to the window operator assembly, assign the window ID to the building ID, and control changes to the assignment of the window ID to the building ID based on a set of rules.

In some aspects, the set of rules are associated with a number of buildings a window ID is permitted to be assigned to, limits to changes to the assignment of the window ID to the building ID, user ID permissions to control the window, and a time limit for a user ID permitted to control the window ID.

In some aspects, the non-transitory computer-readable storage medium further includes instructions that when executed, cause the processor circuitry to communicate updates to the window operator assembly.

In some aspects, the non-transitory computer-readable storage medium further includes instructions that when executed, cause the processor circuitry to communicate a plurality of use rules to a local computing device, the plurality of use rules including: close and lock the window in response to a connection loss with a first wireless communication system, switch to communicating a second type of wireless communications using a second wireless communication system in response to the connection loss with the first wireless communication system, and close and lock the window in response to use of the second wireless communication system and an approved wireless communication device being out of range.

In some aspects, the non-transitory computer-readable storage medium further includes instructions that when executed, cause the processor circuitry to prevent the window ID from being reassigned to a different building ID and/or being removed from the building ID.

Some aspects of the present disclosure are directed to non-transitory computer-readable storage medium comprising instructions that when executed cause processor circuitry to: scan a portion of a window operator assembly connected to a window of a building to obtain a window identifier (ID) associated with the window operator assembly, identify an associated building ID, communicate the window ID and a building ID to a remotely-located computing device, establish encrypted wireless communication with the window operator assembly using a first wireless communication system, and control access to the window operator assembly based on a set of rules obtained from the remotely-located computing device.

In some aspects, the non-transitory computer-readable storage medium further includes instructions that when executed, cause the processor circuitry to group the window ID with other window IDs, and communicate a message to the group to simultaneously and/or concurrently control a position of each of the associated windows.

In some aspects, the non-transitory computer-readable storage medium further includes instructions that when executed, cause the processor circuitry to provide a graphical user interface (GUI) indicating an alert in response to communication from the window operator assembly indicative of: loss of connection to the first wireless communication system, an approved wireless communication device out of range, the window being closed and locked in response to event, an error, a sensor event, and a communication attempt with non-authorized devices.

In some aspects, the non-transitory computer-readable storage medium further includes instructions that when executed, cause the processor circuitry to provide a revised GUI including an adjustable icon.

Some aspects of the present disclosure are directed to non-transitory computer-readable storage medium comprising instructions that when executed cause processor circuitry to: provide a graphical user interface (GUI) on a display of a computing device, the GUI including an adjustable icon, and in response to a user input to the GUI that is associated with the adjustable icon, wirelessly communicate a message to a window operator assembly to cause a window coupled to the window operator assembly to change a position based on the user input.

In some aspects, the GUI further includes a speed control icon, and in response to a second user input to the GUI associated with the speed control icon, the instructions are executable to cause the processor circuitry to wirelessly communicate the message to cause the change in the position of the window at a controlled speed based on the user input and the second user input.

In some aspects, the adjustable icon controls a direction of motion of the window to move to the position.

In some aspects, the non-transitory computer-readable storage medium further includes instructions that when executed, cause the processor circuitry to provide feedback to a user indicative of the change in the position of the window.

In some aspects, the GUI is associated with a group of windows that includes the window, and the message is wirelessly communicated to each window of the group and causes each window of the group to be in a similar position.

In some aspects, the non-transitory computer-readable storage medium further include instructions that when executed, cause the processor circuitry to provide notification of an error and, in response to further user input, wirelessly communicate another message to the window to perform a self-zeroing operation.

In some aspects, the non-transitory computer-readable storage medium further include instructions that when executed, cause the processor circuitry to provide a notification of a sensor alert in response to communication from the window operator assembly.

In some aspects, the non-transitory computer-readable storage medium further include instructions that when executed, cause the processor circuitry to instruct the user to scan a window identifier (ID) on the window operator assembly in response to connection loss of a wireless communication and, in response to the scan, identify a plurality of window operator assemblies associated with a building and update each of the plurality of window operator assemblies to a new communication setting including the use of a new wireless communication system for wireless communications.

Some aspects of the present disclosure are directed to a system comprising a window operator assembly connected to a window of a building, a local computing device, and remotely-located computing device. The window operator assembly including a motor coupled to components of the window, and processor circuitry coupled to the motor and configured to control the motor and thereby control a state of the window. The local computing device configured to identify a window identifier (ID) associated with the window operator assembly, identify a building ID to associate with the window ID based on user input, wirelessly communicate the window ID and the building ID to remotely-located computing device, and wirelessly communicate with the processor circuitry of the window operator assembly to control a state of the window. The remotely-located computing device configured to assign the window ID to the building ID in a database, and control changes to the assignment of the window ID to the building ID in the database based on a set of rules.

In some aspects, the local computing device includes a display and is further configured to: provide a graphical user interface (GUI), and control the state of the window by communicating a message to the processor circuitry of the window operator assembly that is indicative of at least one of a direction of movement of the window, a position of the window, and a speed of the movement of the window in response to a user input to the GUI.

In some aspects, the window operator assembly further includes communication circuitry configured to provide a first type and a second type of wireless communications with a first wireless communication system and a second wireless communication system. And, the processor circuitry is further configured to identify connection loss between the communication circuitry and the first wireless communication system, and in response, cause the communication circuitry to switch to the second wireless communication system and cause the window operator assembly to perform an action.

Some aspects are directed to system comprising a plurality of wireless communication devices communicating over a local network via a first wireless communication system. The plurality of wireless communication devices including a window operator assembly connected to a window and configured to adjust a state of the window and a local computing device configured to run an application to control the state of the window.

In some aspects, the plurality of wireless communication devices further include an alarm system control device configured to communicate with the window operator assembly and/or the local computing device to prevent activation of an alarm system when the window is in an open position and/or is unlocked.

In some aspects, the plurality of wireless communication devices further include a heating, ventilation, and air conditioning (HVAC) control device and a plurality of window operator assemblies each connected to a respective window, wherein the local computing device is configured to control: opening of a subset of the plurality of windows via communication with the plurality of window operator assemblies; closing of the remaining plurality of windows via the communication with the plurality of window operator assemblies; and activation of a HVAC system via communication with the HVAC control device to create positive air pressure.

In some aspects, the creation of positive air pressure reduces a risk of exposure to viral contaminants including those associated with COVID-19.

In some aspects, the plurality of wireless communication devices further include a home automation device configured to receive a voice command from a user and, in response, direct to the window operator assembly to control the state of the window, wherein the home automation system, the window operator assembly, and/or the local computing device are configured to authorize the voice command in response to a verification factor from a user approved device.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

Figure 1:
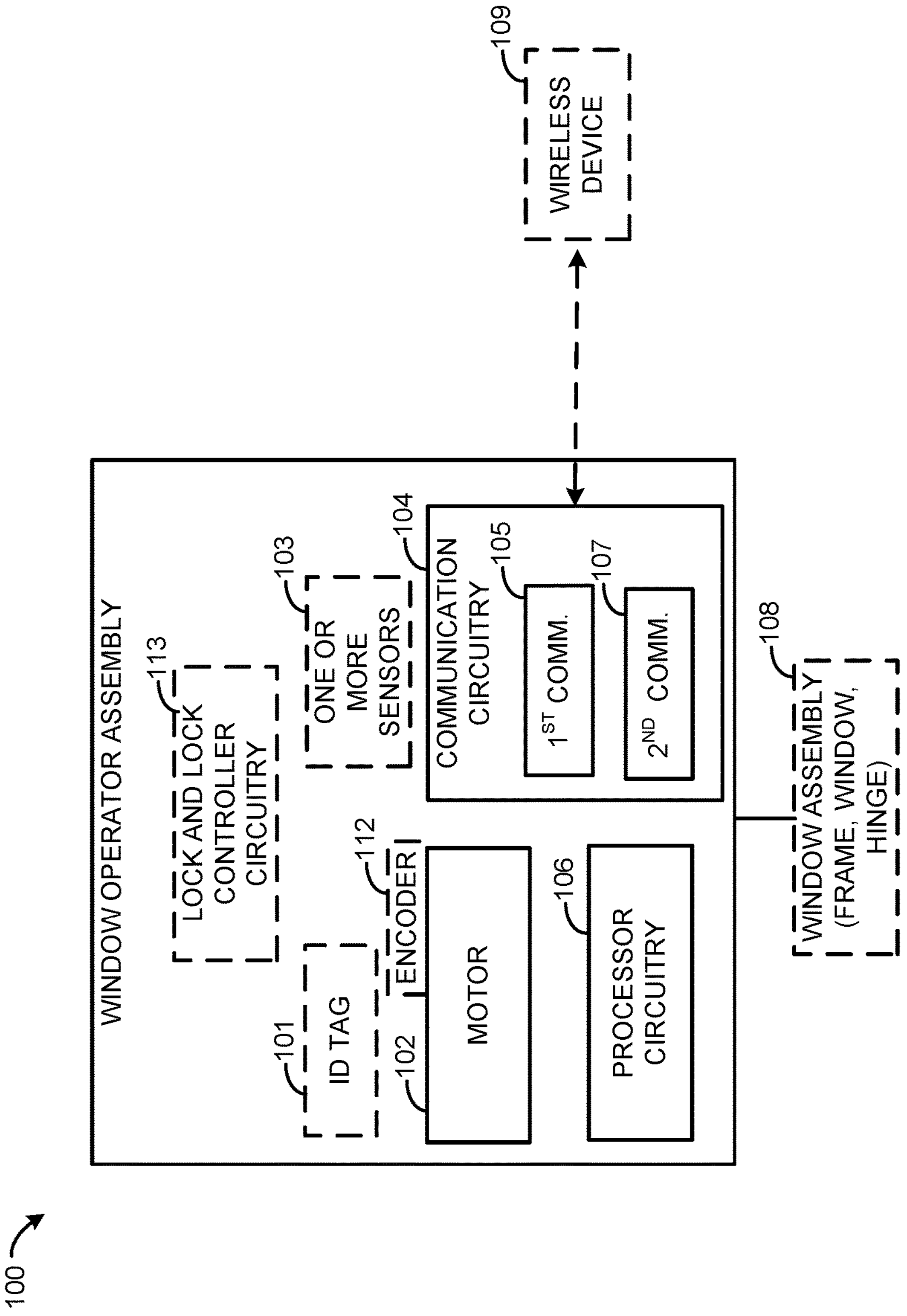
FIG. 1 illustrates an example window operator assembly, in accordance with examples of the present disclosure.

In the following detailed description, reference is made to the accompanying drawings, which form a part hereof, and in which is shown by way of illustration embodiments in which the disclosure may be practiced. It is to be understood that other embodiments may be utilized and mechanical changes may be made without departing from the spirit and scope of the present disclosure. The following detailed description is, therefore, not to be taken in a limiting sense.

Directional terminology such as “top”, “bottom”, “front”, “rear”, etc. is used with reference to the orientation of the Figure(s) being described. Because components of embodiments can be positioned in a number of different orientations, directional terminology is used for purposes of illustration and is in no way limiting.

Embodiments of the disclosure are directed to a window operator assembly interconnecting a window assembly including a window frame and a sash of a window. The sash is pivotally mounted to the frame. The window operator assembly may include a motor, communication circuitry, and processor circuitry. The motor may be coupled to an elongate member and causes the elongate member to move, thereby changing a position of the sash, such as moving the window to an open position, a closed position, or any position between. The communication circuitry is configured to provide a first type and a second type of wireless communications with a first wireless communication system and a second wireless communication system. The processor circuitry may identify connection loss between the communication circuitry and the first wireless communication system, and in response, cause the communication circuitry to switch to the second wireless communication system and cause the window operator assembly to perform an action, such as activating the motor to move the window to a closed position. The use of multiple types of wireless communication and triggering automatic action by the window operator assembly in response to connection loss may increase security and improve user functionality for a window assembly that operates using wireless communications. For example, if an Internet connection is lost, a user may still operate the window using a second wireless communication, such as Bluetooth. The windows may automatically close to prevent or mitigate nefarious personnel from accessing the building, such as a burglar that causes the loss of Internet connection.

Some embodiments are directed to processor circuitry of a computing device which is remotely-located from the window operator assembly and provides back-end control of access to control of the window. The device may receive a window identifier (ID) associated with a window operator assembly and a building ID associated with a building containing a window connected to the window operator assembly, assign the window ID to the building ID, and control changes to the assignment of the window ID to the building ID based on a set of rules.

Other embodiments are directed to processor circuitry of a computing device which communicates with the window operator assembly and provides local control of the window. The computing device may include a local computing device that operates an application, such as a smartphone, a tablet, or laptop. The device may scan a portion of the window operator assembly to obtain (e.g., read) a window ID associated with the window operator assembly, identify an associated building ID, and communicate the window ID and building ID to a remotely-located computing device. The remotely-located computing device may operate the back-end of the service provided by the application, such as storing that the window ID is associated with the building ID in a database and controlling changes to the association in the database based on a set of rules. The computing device may further establish encrypted wireless communication with the window operator assembly using a first wireless communication system and control access to the window operator assembly based on the set of rules obtained from the remotely-located computing device.

In some embodiments, the computing device that operates the application may provide a graphical user interface (GUI) on a display of the device. The GUI may include an adjustable icon, such as a slide bar, a dial, and an image of a window, among others. In response to user input to the GUI associated with the adjustable icon, the computing device wirelessly communicates a message to the window operator assembly to cause the window coupled to the window operator assembly to change a position based on the user input. As further described below, in some embodiments, a single user input may cause multiple actions by the window operator assembly, such as locking or unlocking a lock and moving the window to a closed or open position. Further, the user can provide the user input and the window automatically moves position(s) without further user action.

Various embodiments are directed to systems which include the window operator assembly and other devices. In some embodiments, a system comprises the above-described window operator assembly, local computing device, and remotely-located computing device. In other embodiments and/or in addition, a system may include a plurality of wireless communication devices that communicate over a local network via a first wireless communication system, with the plurality wireless communication devices including at least one window operator assembly and at least one local computing device. The wireless communication devices each include a computing device that has wireless communication capabilities. The system is or includes an Internet of Things (IOT) system including different computing devices of a building which may communicate to one another and operate in coordination with one another, as further described below.

Turning now to the figures, FIG. 1 illustrates an example window operator assembly, in accordance with the principles of the present invention. The window operator assembly 100 may be used to control a position of a coupled window assembly 108, such as the position of a window in a window frame.

The window operator assembly 100 includes a motor 102, communication circuitry 104, and processor circuitry 106. The window operator assembly 100 may be used to control the window assembly 108, including changing positions of the window, via the processor circuitry 106 and the motor 102. The window assembly 108 may include a window in a window frame, with the sash pivotally mounted to the window frame and coupled to the elongate member, as further shown by FIGS. 2A-2B The motor 102 may be coupled to the elongate member of the window assembly 108 and may cause the elongate member to move a position of a sash of the window assembly 108, thereby moving a position of the window between an open position and a closed position. The processor circuitry 106 may activate the motor 102, as further described below.

The window operator assembly 100 may communicate with other devices using different types of wireless communications. For example, the communication circuitry 104 may provide a first type of wireless communication 105 and a second type of wireless communication 107 with a first wireless communication system and a second wireless communication system. The first type of wireless communication 105 may be associated with a longer range than the second type of wireless communication 107. For example, the first type of wireless communication 105 may include Wi-Fi and the second type of wireless communication 107 may include Bluetooth. The communication circuitry 104 may wirelessly communicate data using telemetry components according to wireless protocols associated with the first and second wireless communication systems. In various embodiments, the wireless communication using the first and second wireless communication systems may both be encrypted. Example telemetry components include a transmitter, a receiver, or a combination transceiver, and an antenna (e.g., inductive telemetry antenna).

The processor circuitry 106 is configured to activate the motor 102 to move the window to a position and at a set speed based on communication from external circuitry, such as via communication from the wireless communication device 109 and using the communication circuitry 104. In some embodiments, the processor circuitry 106 may control a set speed of the movement of the window based on pulse width modulation (PWM) of the motor 102. In some embodiments, a motor encoder 112 may be coupled to the motor 102 to provide feedback data to the processor circuitry 106 used to adjust the PWM, as further described below. As further described below, processor circuitry 106 includes and/or refers to a presently developed or future developed processor (or processing resources) that executes computer readable instructions contained in memory. The processor circuitry 106 may be used to switch between the first and second wireless communication systems. For example, the processor circuitry 106 may identify connection loss between the communication circuitry 104 and the first wireless communication system, and in response, cause the communication circuitry 104 to switch to the second wireless communication system and cause the window operator assembly 100 to perform an action.

A variety of different actions may be performed by the window operator assembly 100 in response to switching to the second wireless communication system. In some embodiments, the processor circuitry 106 may activate the motor 102 to move the window of the window assembly 108 (connected to the window operator assembly 100) to a closed position in response to the connection loss. The processor circuitry 106 may do so automatically, to provide a safety feature such that window(s) in a building (e.g., a home) automatically close when a first wireless communication (e.g., a Wi-Fi signal) is lost. In some embodiments, the processor circuitry 106 may cause the window of the window assembly 108 to lock in the closed position, in response to the connection loss. In some embodiments, the processor circuitry 106 may cause the communication circuitry 104 to communicate a message using the second type of wireless communications to the wireless communication device 109, which may be associated with a user. The message may be indicative of the lost connection and/or notify a user associated with the window assembly 108 that the window is moving to a closed position, is in the closed position, and/or is being locked in response to the lost connection. In some embodiments, the message may provide a prompt for the user to verify the window is to be placed in the closed position and/or approval to leave or reposition the window back to an open position that the window was in prior to the lost connection.

In some embodiments, the processor circuitry 106 may verify the wireless communication device 109 is an approved device connected to the second wireless communication system and/or is within a threshold range of the window operator assembly 100. For example, the processor circuitry 106 can verify the wireless communication device 109 is a Bluetooth connected device within the threshold range, and optionally in response, may override closing the window of the window assembly 108. In some embodiments, various combinations of the above actions may be initiated by the processor circuitry 106 in response to the connection loss.

In some embodiments, the processor circuitry 106 may cause the communication circuitry 104 to switch to the second wireless communication system 107 and to connect to a third wireless communication system associated with the first type of wireless communication 105. For example, a user may switch to a new Wi-Fi system. In response to connection loss with the first Wi-Fi system, the processor circuitry 106 may cause the communication circuitry 104 to switch to Bluetooth, which is used by the user to subsequently connect the communication circuitry 104 to the new Wi-Fi system. As further described below, the window operator assembly 100 may have a window ID that is registered to associate the window operator assembly 100 and the coupled window assembly 108 to a building. Non-limiting examples of buildings include a house, a townhouse, an apartment building and/or an apartment, a condominium building and/or condominium, an office building, a commercial store building, a factory, a school and/or college building, a daycare center, among other commercial, retail, and/or residential buildings. A plurality of windows in the building may have similar window operator assemblies as the window operator assembly 100 and are registered to the building ID and connected to the first wireless communication system. By changing the wireless communication setting for the window operator assembly 100 to the third wireless communication system, all window IDs associated with the building ID may be automatically updated to communicate using the third wireless communication system.

In some embodiments, switching to the second wireless communication system may allow for communication with the window operator assembly 100 and control over the window assembly 108 to be maintained even with the lost connection with the first wireless communication system. Maintaining the communication may be useful for security purposes. Performing the action(s) may provide for additional security by closing window(s) in a building in response to loss of the first (primary) type of wireless communication. In some embodiments, setup of the window occurs in the second wireless communication system (e.g., Bluetooth) as wireless communication allows for easier initial communication and provides a way to assign the information associated with the first wireless communication system (e.g., WiFi) for ongoing communications. As an example, Bluetooth is good for nearby, direct control when internet access is not available. Some of the example first and second wireless communication systems have existed for a long period of time and changes to the standards associated therewith occur in increments, which allows for longer term methods to communicate as technology changes.

As noted above, a motor encoder may be coupled to the motor 102. A motor encoder, as used herein, is an electromechanical device that provides an electrical signal indicative of the motor turning. For example, the motor encoder 112 may include a circuit board with a magnet attached to the motor shaft of the motor 102. Each time the motor 102 turns, the circuit board may count a number of magnetic pulses (e.g., seven pulses per motor turn) using the magnet as encoder counts, and based on the encoder counts, the processor circuitry 106 and/or motor encoder 112 may determine the position of the window. The motor encoder 112 may provide the encoder counts as feedback data to the processor circuitry 106. For example, as further described below, based on a configuration of the window operator assembly 100 and/or a self-zeroing process, positions of the window may be determined using the encoder counts. In some embodiments, as the window is at or near the open or closed positions, the motor 102 may slow down or stop, which may be identified using the feedback data.

In some embodiments, the encoder count may be used to keep the motor 102 at a constant speed, sometimes referred to as "cruise control". For example, feedback data from the motor encoder 112 may be provided to the processor circuitry 106 and the processor circuitry 106 may determine the encoder counts are coming it at a slower rate than before. In response, the processor circuitry 106 increases the PWM (e.g., voltage) to the motor 102 to keep the motor 102 at the same or constant speed.

Control of the window assembly 108 may be provided using additional security features. For example, the processor circuitry 106 may encrypt the first type and second type of wireless communications over the wireless communication systems 105, 107 prior to the communication circuitry 104 communicating with other devices. Similarly, the processor circuitry 106 can decrypt and authenticate communications from other devices.

In some embodiments, the window operator assembly 100 includes a portion containing an ID. For example, the portion may include an ID tag 101. The ID tag 101 may be scanned by the wireless communication device 109 to provide the window ID. For security purposes, the ID tag 101 may include a near field communication (NFC) tag, however examples are not so limited and may include other types of tags or other sources that may be scanned to provide a window ID, such as a QR code, and a bar code, among others. The ID tag 101 or other portion of the window operator assembly 100 may be scanned in order to associate the window ID with a building, as further described herein.

In some embodiments, the ID tag 101 may be used as an added security for switching to a different communication system for a building. For example, prior to changing the wireless communication setting for all window operators assemblies (e.g., window IDs) of a building, one ID tag 101 of the window operator assemblies may be scanned and then used to bulk update the wireless communications setting for all windows of the building.

In some embodiments, the window operator assembly 100 may include or be coupled to one or more sensors 103. The one or more sensors 103 may include a pressure sensor, a liquid sensor, a glass break sensor, a motion sensor, a magnetic sensor, and various combinations thereof.

In some embodiments, the window operator assembly 100 includes or is coupled to a pressure sensor that communicates with the processor circuitry 106. The processor circuitry 106 may stop movement of the window in response to a sensor signal from the pressure sensor indicating the movement is slower than a threshold speed. In some embodiments, the sensor includes the motor encoder 112 and the movement being slower than the threshold speed may be determined using feedback data from the motor encoder 112 coupled to the motor 102.

In some embodiments, the window operator assembly 100 includes or is coupled to a liquid sensor that communicates with the processor circuitry 106. The processor circuitry 106 may close the window in response to a sensor signal from the liquid sensor indicating occurrence of rain or other sources of liquid (e.g., sprinkler, water leak in the building).

In some embodiments, the window operator assembly 100 includes or is coupled to a glass break sensor that communicates with the processor circuitry 106. The processor circuitry 106 may communicate an alert, via the communication circuitry 104 and to external circuitry, in response a sensor signal from the glass break sensor indicating the window is being broken. The external circuitry, as used herein, may include the wireless communication device 109 or another device. In some embodiments, the glass break sensor may include a wireless sensor that detects the glass of the window being broken, and in response, sends a wireless signal over the cloud to the external circuitry. In some embodiments, the wireless signal may cause control of operation of the window operator assembly 100 by an application being run by the wireless communication device 109 and/or over a cloud computing system.

In some embodiments, the window operator assembly 100 includes or is coupled to a motion sensor that communicates with the processor circuitry 106. The processor circuitry 106 may communicate an alert, via the communication circuitry 104 and to external circuitry, in response a sensor signal from the motion sensor indicating the window is being manually moved.

In various embodiments, the window operator assembly 100 further includes lock motor assembly including a motor, a lock, and lock controller circuitry 113. The lock may include a lock bar and keepers, with the lock bar being located in or forming part of the window frame of the window assembly 108 and the keepers being located in or forming part of the sash of the window assembly 108. The lock motor assembly moves the lock bar to engage and disengage the keepers on the sash, such that the lock bar may slideably attach to the frame and to engage and disengage the keepers. The lock controller circuitry may include a processor circuitry (which may include an additional processor circuitry or the processor circuitry 106) that provides power and control to the motor. The lock may be positioned in a locked position or unlocked position. The locked position of the lock includes the lock bar being engaged with and locked in with the keepers. The unlocked position includes bar being unengaged with the keepers.

As the window is moving from an open position to a closed position, the lock bar is moved to activate the lock and, in response, hits the gasket such that there is an increase in force on the lock bar. The keepers then move the sash into the fully closed and locked position by moving the sash further against the gasket to compress the gasket in the fully closed and locked positon. In some embodiments, the motor of the lock motor assembly includes another motor encoder, which provides an encoder count indicative of motor movement and changes in speed to the processor circuitry as feedback data. The processor circuitry uses the same to detect the speed of the motor of the lock motor assembly and to increase or decrease the PWM (e.g., voltage) to the motor to keep the speed constant or at the same level.

In some embodiments, the window operator assembly 100 includes or is coupled to a magnetic sensor that communicates with the processor circuitry 106 and a magnet. The processor circuitry 106 may identify the window is unlocked or locked based on sensor signals from the magnetic sensor and from the magnetic sensor interacting with the magnet. The magnet and magnetic sensor may be used to determine or signal that the window is a in a closed position, and may not directed sense whether the lock is unlocked or locked. In various embodiments, there is correlation between the window position and the lock position, as the window position changes slightly between the locked and unlocked position of the lock. The magnet and sensor (e.g., Hall sensor) may detect this change in window position caused by the lock moving from an unlocked position to a locked position while the window is the closed position. However, embodiments are not so limited, and the processor circuitry 106 may determine the window is locked or unlocked based on the set position of the lock and without use of a sensor.

In some embodiments, the magnetic sensor is used to detect the window is in or near a closed position and/or an open position. For example, a magnet may be located on the sash and the magnetic sensor may be located on the window frame. In response to the window frame being within a threshold distance of the sash (e.g., one to 1.5 inches away), the magnetic sensor may detect a magnetic field from the magnet. As the sash gets closer, the magnetic field gets stronger. As may be appreciated, each magnet may be different (e.g., exhibits different strength magnetic fields) and the magnetic sensors may be located differently in the window frame, resulting in different signal strengths from the different magnetic sensors when the windows are at or near the closed positions between different windows. In some embodiments, the magnetic sensor can be calibrated during a setup and/or self-zeroing process, as further described below.

Figure 2A:
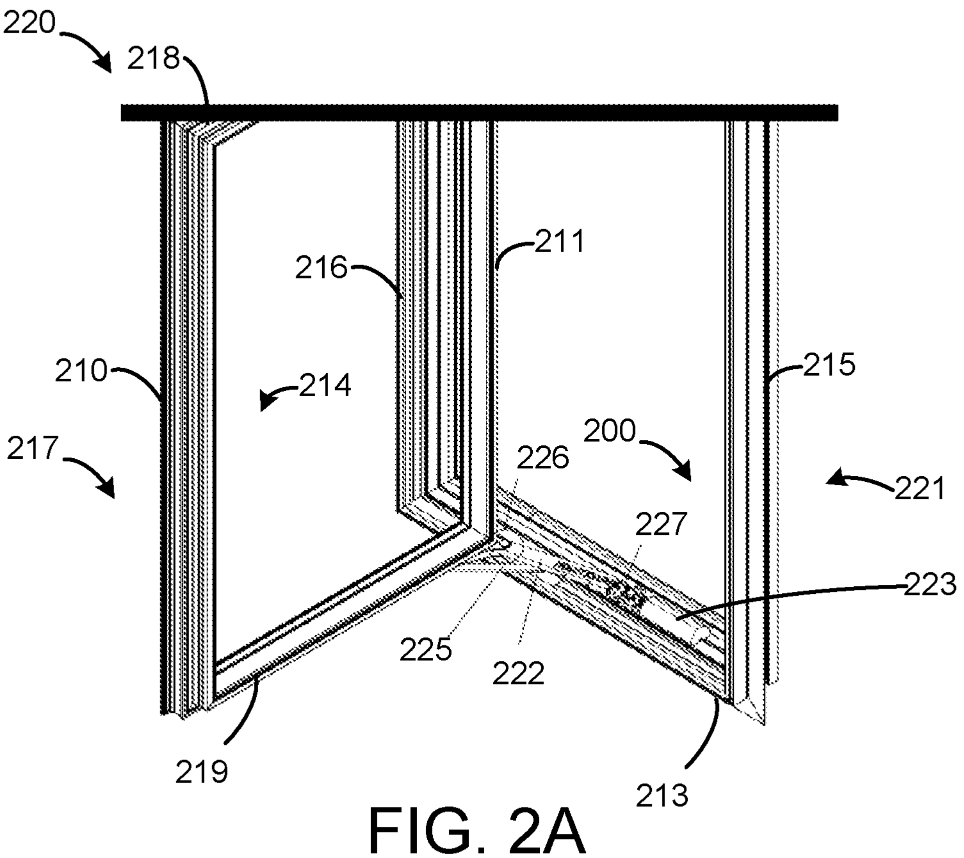
FIGS. 2A-2B illustrate an example of a window assembly coupled to the window operator assembly shown in FIG. 1, in accordance with examples of the present disclosure.
Figure 2B:
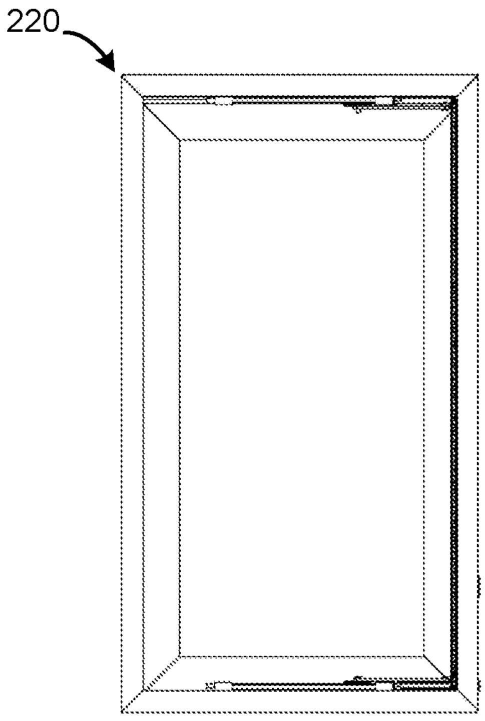

FIGS. 2A-2B is an example of a window assembly coupled to the window operator assembly shown in FIG. 1, in accordance with the principles of the present invention. Although it is recognized that any suitable type of window may be used, the example window assembly 220 includes a window frame 221, window (e.g., glass pane 214), and a sash 217. The window frame 221 is formed by a top member (not shown) operatively connected to a bottom member 213 by a first side member 215 and a second side member 216. The sash 217 is formed by a top member 218 operatively connected to a bottom member 219 by a first side member 210 and a second side member 211. The sash 217 is operatively connected to the window frame 221 for relative movement between the open and closed positions. For example, the sash 217 may be moved in a controlled manner relative to the window frame 221 such that the sash 217 pivots, pivots and translates, pivots and slides, rotates, or otherwise moves relative to the window frame 221. Movement of the window operator assembly 200 opens or closes the sash 217 relative to the window frame 221. A hinge 225 interconnects the frame 221 and the sash 217, and the hinge 225 controls the path of the sash 217 with respect to the frame 221, and the window operator assembly 200 positions the sash 217 along the path by changing the distance between a sash pivot 226 and a frame pivot 227.

One or both of top and bottom window operator assemblies may be used. For larger windows, using both the top window operator assembly and the bottom window operator assembly adds strength and stability to the system and makes it easier to open and close the sash. For smaller windows, the window operator assembly 200 may be positioned on either the top member (not shown) or the bottom member 213 of the window frame 221.

Embodiments may include at least one motor. There may be a motor proximate the top and/or the bottom of the window frame 221 and there may be more than one motor proximate the top and/or the bottom of the window frame 221. The motor(s) may allow for operation of the assembly utilizing a variety of actuating sources such as, but not limited to, a wall switch, a remote control, a mobile phone app, a home security system, a heating, ventilation, and air conditioning (HVAC system), and other types of home automation systems. If there is a loss of power to the system, there may be a manual override.

The window operator assembly 200 includes a housing 223. In this embodiment, the housing 223 is configured and arranged to contain at least portions of the window operator assembly 200 including the motor, communication circuitry, and processor circuitry as described by FIG. 1. In some embodiments, the window assembly 220 may be implemented to include substantially the same features and operations as described in U.S. Pat. No. 11,002,057, entitled "Window Operating System", granted May 11, 2021, which is fully incorporated herein in its entirety for its teaching.

In use, the motor causes the elongated member (not illustrated), which is housed by the elongate housing 222 to move, and the sash 217 pivots about the sash pivot 226 and moves toward its closed position. FIG. 2A illustrates an example of the window in an open position and FIG. 2B illustrates an example of the window in the closed position.

Figure 3:
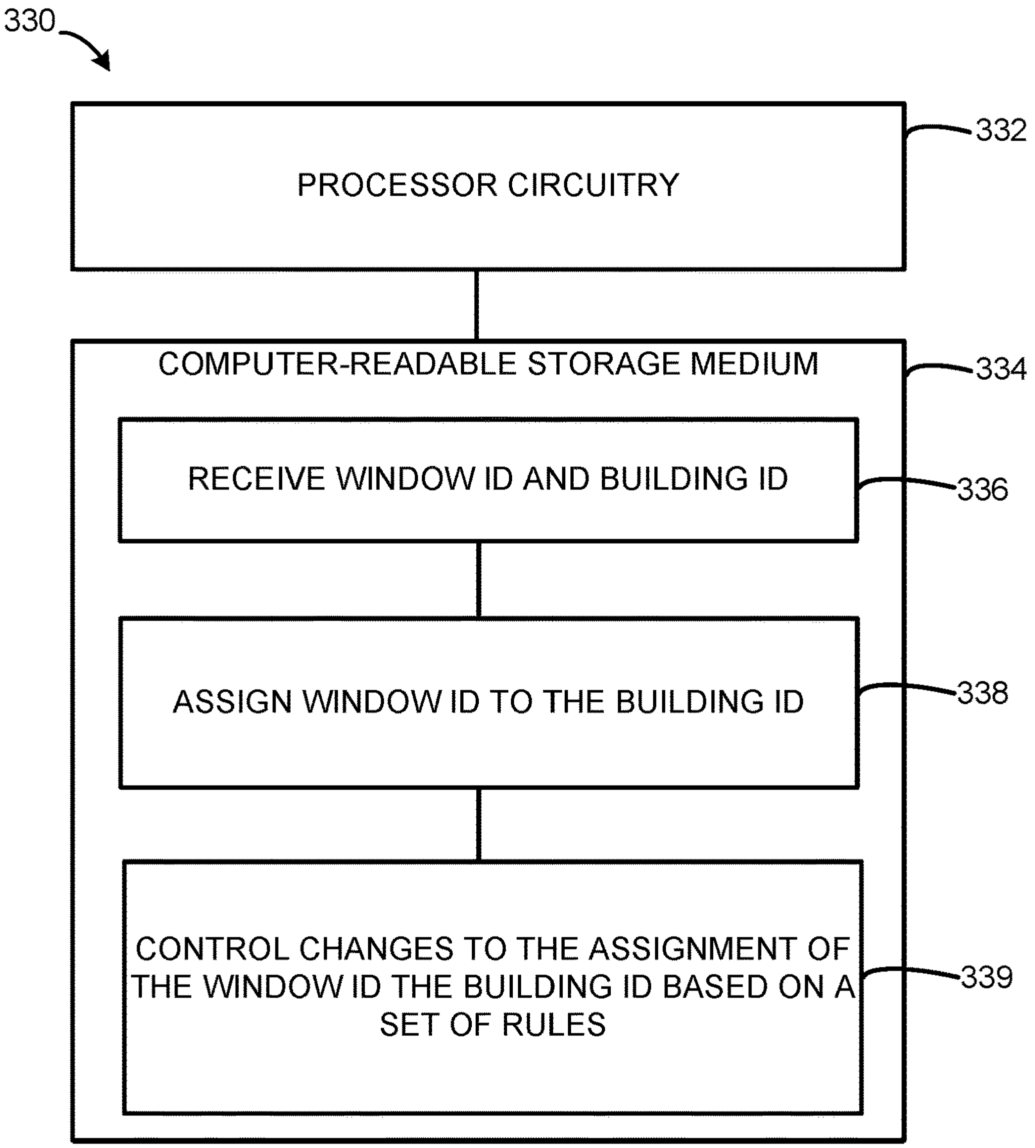
FIG. 3 illustrates an example computing device including non-transitory computer-readable storage medium, in accordance with examples of the present disclosure.

FIG. 3 illustrates an example computing device including non-transitory computer-readable storage medium, in accordance with examples of the present disclosure. The computing device 330 includes processor circuitry 332 and memory circuitry. The memory circuitry may include a computer-readable storage medium 334 storing a set of instructions 336, 338, and 339. The computing device 330 may include a device that is remotely located from the window operator assembly, sometimes herein referred to as a "backend control device" or a "remotely-located computing device".

The computer-readable storage medium 334 (as well as the computer-readable storage medium 444 illustrated by FIG. 4) may include Read-Only Memory (ROM), Random-Access Memory (RAM), Electrically Erasable Programmable Read-Only Memory (EEPROM), flash memory, a solid state drive, Electrically Programmable Read Only Memory aka write once memory (EPROM), physical fuses and e-fuses, and/or discrete data register sets. In some examples, computer-readable storage medium 334 may be a non-transitory storage medium, where the term "non-transitory" does not encompass transitory propagating signals.

At 336, the processor circuitry 332 may receive a window ID associated with a window operator assembly and a building ID associated with a building containing a window connected to the window operator assembly. The window operator assembly may include or be implemented to include substantially the same features as the window operator assembly 100 of FIG. 1, the details of which are not repeated.

At 338, the processor circuitry 332 assigns the window ID to the building ID. The processor circuitry 332 may store the assignment in a database that includes a plurality of window IDs associated with respective building IDs. The database may further include sets of rules for controlling changes to the assignments, which may be different for different building IDs.

At 339, the processor circuitry 332 controls changes to the assignment of the window ID to the building ID based on a set of rules. The set of rules may be associated with a number of buildings a window ID is permitted to be assigned to, limits to changes to the assignment of the window ID to the building ID, user ID permissions to control the window, and a time limit for a user ID permission (e.g., permitted) to control the window ID. In some embodiments, a window ID may be permitted to be assigned to one building (e.g., building ID) only, and there may be limits to changes to the assignment without user authorized release or a threshold amount of time. In some embodiments, different users with associated user IDs may be given permission to control the window and which may be associated with a time limit for the control, such as providing time-limited permission to a renter (e.g., Airbnb), a contractor performing work, or for other purposes. As further described below, the window operator assembly may form part of an IOT system with other devices in the building, and the time-limited permission may be granted for any device that is part of the IOT system, such as HVAC or security system and with the owner of the building or other user associated with the building ID have override authority. Changes to authorized control of the window may be restricted by the set of rules and by the processor circuitry 332, which may be in communication with local computing devices (e.g., smartphones, laptop computers) running applications to instruct respective window operator assemblies associated with a building ID. For example, the processor circuitry 332 may prevent the window ID from being reassigned to a different building ID or being removed from the building ID, such as based on the set of rules.

In some embodiments, the processor circuitry 332 communicates updates to the window operator assembly (e.g., push updates). The communication may be provided directly from the computing device 330 to the window operator assembly or to a computing device that is locally located with respect to the window operator assembly, sometimes herein referred to as "a local computing device", that provides the update to the window operator assembly. For example, the processor circuitry 332 may push an update to all window operator assemblies associated with a building ID by communicating with each window operator assembly or with the local computing device.

Similarly and/or which may be included as an update, the processor circuitry 332 may communicate a plurality of use rules to the local computing device. The local computing device may include a wireless communication device, such as smartphone as previously described. Example use rules include rules associated with or directing a window operator assembly to: i) close and lock window(s) associated with a building ID in response to connection loss with a first wireless communication system (e.g., Wi-Fi); ii) switch to communicating a second type of wireless communications using a second wireless communication system (e.g., Bluetooth) in response to connection lost with the first wireless communication system (e.g., Wi-Fi); and iii) close and lock the window(s) in response to use of the second wireless communication system (e.g., Bluetooth) and an approved wireless communication device being out of range.

As described above, the processor 332 and computer-readable storage medium 334 may form part of computing device 330 that is a remotely-located computing device, or part of a computing device that is local to the window operator assembly, such as a local server or computer of a building e.g., a local computing device. In some examples, the computing device 330 forms part of a cloud computing system having a plurality of remotely-located and/or distributed computing devices. For example, although FIG. 2 illustrates a single processor 332 and a single computer-readable storage medium 334, examples are not so limited and may be directed to devices and/or systems with multiple processors and multiple computer-readable storage mediums. The instructions may be distributed and stored across the multiple computer-readable storage mediums and may be distributed and executed by the multiple processors. In some embodiments, the processor 332 provides security to the system, such as for an IOT and/or cloud computing system, which may be used for home security.

FIGS. 4A-4D illustrates another example computing device including non-transitory computer-readable storage medium, in accordance with examples of the present disclosure. Similar to the computing device 330 of FIG. 3, the computing device 440 includes processor circuitry 442 and memory circuitry that may include a computer-readable storage medium 444 storing a set of instructions. The details of the various components are not repeated. The computing device 440 of FIGS. 4A-4B may include a local computing device that is located proximal to a window operator assembly and may be in communication with a remotely-located device, such as the computing device 330 of FIG. 3.

Figure 4A:
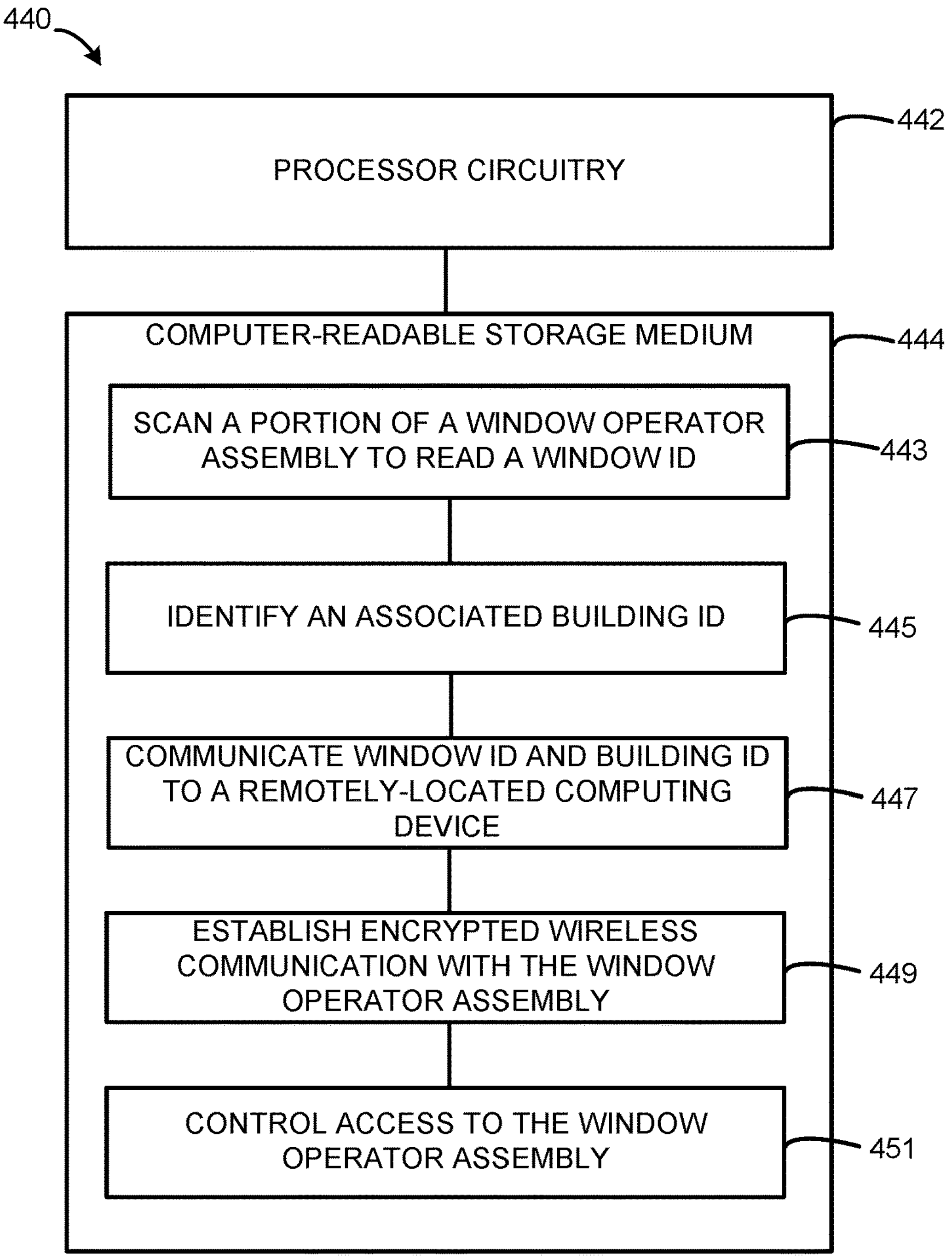
FIGS. 4A-4D illustrate another example computing device including non-transitory computer-readable storage medium, in accordance with examples of the present disclosure.

In some embodiments, the computing device 440 may be used to register and control operations of window operator assemblies of a building, as shown by FIG. 4A. For example, at 443, the processor circuitry 442 may scan a portion of a window operator assembly connected to a window of a building to obtain or read a window ID associated with the window operator assembly. The window operator assembly may include the assembly 100 previously described by FIG. 1. The portion of the window operator assembly may include a tag containing the window ID, such as a NFC tag, QR tag, or tag containing a barcode or other scannable information. In some embodiments, the tag is fully enclosed by the frame of the window (e.g., located within the wood of the window frame of the window), such that no hardware of the window operator assembly is visually exposed to a user. At 445, the processor circuitry 442 may identify an associated building ID. For example, the building ID may be identified by a user input to the computing device 440, based on geographical tagging of the device (e.g., GPS location that places near the building) and/or based on building ID that is associated with a user ID of the user. For example, the user may enter log-in information (e.g., user name and password associated with a user ID) which identifies a building ID the user is authorized to and/or allows the user to register a building ID for a new building. For a new building ID, the processor circuitry 442 may communicate with the remotely-located computing device, which provides the building ID and allows for the user ID to register additional window operator assemblies to the building ID. At 447, the processor circuitry 442 communicates the window ID and the building ID to a remotely-located computing device, such as the computing device 330 of FIG. 3 and which stores the association (e.g., an assignment of the window ID to the building ID) in the database. At 449, the processor circuitry 442 may establish encrypted wireless communication with the window operator assembly using a first wireless communication system, and at 451, may control access to the window operator assembly based on a set of rules obtained from the remotely-located computing device.

Figure 4B:
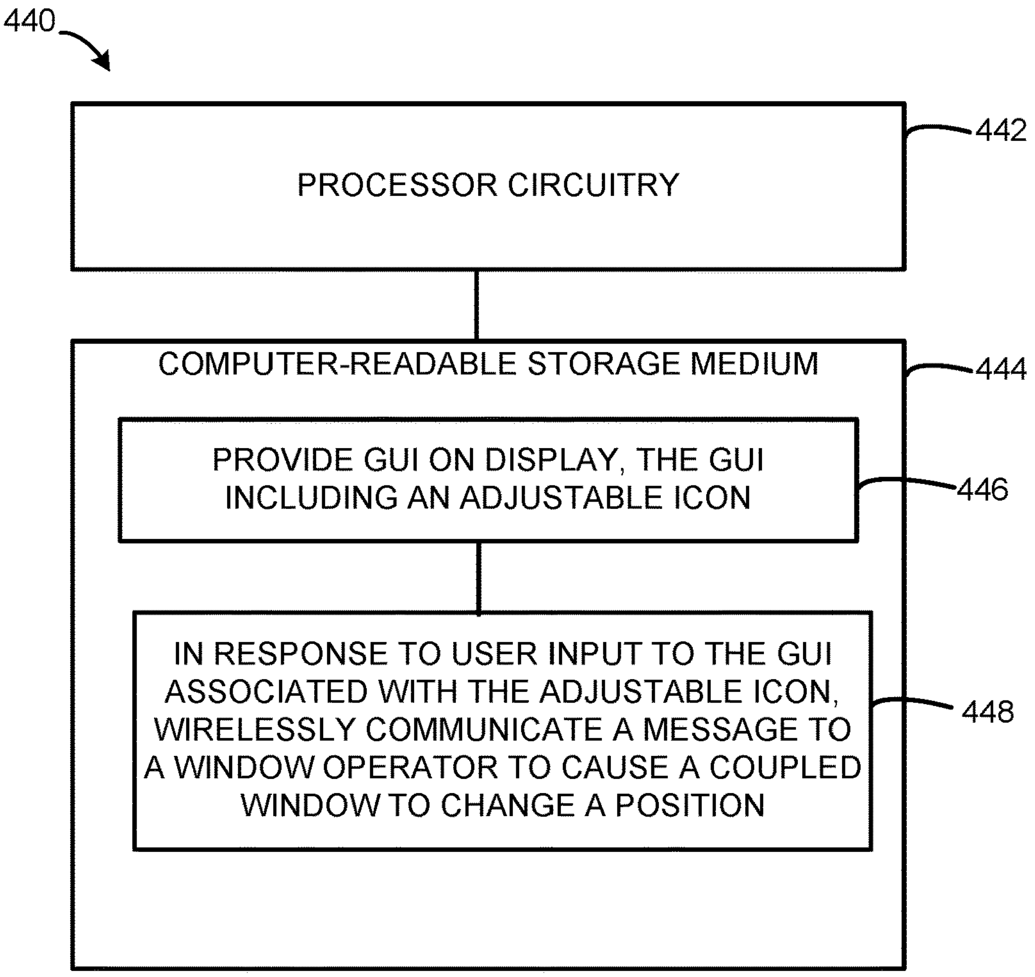

As shown by FIG. 4B, the computing device 440 may provide user control of access and functionalities of the window operator assembly by providing a GUI that the user may interact with and which causes the control of the window. At 446, the processor circuitry 442 may provide the GUI on a display of the computing device 440. The GUI may include an adjustable icon. Example adjustable icons include a slide bar, a dial, and an image of window that is moveable, among others. In response to a user input to the GUI that is associated with the adjustable icon (e.g., selecting, moving, clicking the icon, etc.), at 448, the processor circuitry 442 may wirelessly communicate a message to a window operator assembly to cause a window coupled to the window operator assembly to change a position based on the user input. In some embodiments, the adjustable icon may control a direction of motion of the window used to move to the position.

In some embodiments, a single user input to the GUI may cause multiple actions by the window operator assembly. For example, the single user input to the adjustable icon may cause the lock of the window to move to an unlocked position and cause the window to move from a closed position to an open positon. As another example, the single user input to the adjustable icon may cause the window to move from an open position to a closed positon and the lock of the window to move to a locked position.

In some embodiments, the GUI may further include a speed control icon. For example, in response to the user input or a second user input to the GUI associated with the speed control icon, the processor circuitry 442 may wirelessly communicate the message to cause the change in the position of the window at a controlled speed based on the user input(s). Example speed control icons include a dial, a listing of speed values, images of the speeds (e.g., a rabbit for fast and turtle for slow), among others.

In some embodiments, the processor circuitry 442 may provide feedback to the user to indicate the change in the position. The feedback may include haptic feedback provided through the display, visual feedback on the GUI, and/or audio feedback (e.g., clicking sounds) provided through speakers of the computing device 440. For example, the GUI can change to illustrate the window is in the changed position. In some embodiments, the display of the adjustable icon may automatically change and display in response to the window being in the changed position. As an example, the image of the window on the GUI may be revised to show the window in the changed position (e.g., at 45 degrees open). As another example, the slide bar dial may change to a position indicative of the changed positon of the window. In some embodiments and/or in addition, the GUI may show an indication of the lock being locked or unlocked, such as words indicating the same.

Although not illustrated together, the computing device 440 may include the combination of instructions illustrated by FIGS. 4A-4B.

In some embodiments, the computing device 440 may be used to form groups of windows of the building. The groups may be used to provide simultaneous control of all windows of a group, such as setting each window of the group to a particular position regardless of a starting position. For example, the processor circuitry 442 may group the window ID with other window IDs, and communicate a message to the group to simultaneously and/or concurrently control a position of each of the associated windows. In some such embodiments, the GUI on the display of the computing device 440 may be associated with the group of windows that includes the window, and the message is wirelessly communicated to each window of the group and causes each window of the group to be in a similar position (regardless of a starting position).

In some embodiments, the processor circuitry 442 may provide a GUI indicating an alert for the user. The GUI with the alert may be in response to a communication from a window operator assembly that is indicative of a loss of connection to a first wireless communication system (e.g., Wi-Fi), an approved wireless communication (e.g., Bluetooth connected) device out of range, a window is closed and locked in response to event (e.g., Wi-Fi or Bluetooth loss, rain), an error (e.g., should perform self-zeroing), a sensor event, and a communication attempt with non-authorized devices, among other communications and combinations thereof. For example, the alert may indicate that all window operator assemblies associated with a building ID have lost a wireless connection and that an approved wireless communication device is within or is not within a range which is associated with a second type of wireless communication. The alert may additionally notify the user that all windows have moved to a closed position in response to the connection loss. In some embodiments, the GUI may provide the user with an option to override the movement of the windows and to cause all windows to move back to a position that the windows were in prior to the connection loss. In some embodiments, the override option may be provided prior to the windows moving to the closed position, such as in response the approved wireless communication device being within range and the user providing the input to override closing the windows to the approved wireless communication device (or another computing device) within a threshold amount of time from the connection loss. In some embodiments, the processor circuitry 442 may provide a revised GUI that includes the adjustable icon, which may be used to override the windows closing.

In some embodiments, the processor circuitry 442 may provide notification of an error and, in response to further user input to the GUI, wirelessly communicate another message to the window to perform a self-zeroing operation. The notification may include an alert indicating the error occurred and/or identification of a specific window of the building. The message may not be communicated until the user provides user input as a security feature, which may prevent triggering opening of the window due to a break-in attempt or other issue that causes the error, such as a minor attempting to leave the building (e.g., child safety feature). The self-zeroing operation may include the window operator assembly causing the window to move to the open position and then the closed position to fix the error. In other embodiments, the processor circuitry 442 may provide the notification of an error with the window operator assembly automatically performing the self-zeroing operation The self-zeroing operation, in some embodiments, includes moving the window to multiple positions and obtaining measurements from motor encoder(s) and/or other sensors. In some embodiments, the self-zeroing process may be triggered by or initiated in response to the user selected an icon on a GUI associated with an application run by the local computing device. In some embodiments, the self-zeroing process may automatically be triggered by the window operator assembly (e.g., by the processor circuitry 106 of FIG. 1) in response to an event. For example, the self-zeroing operation may include the window operator assembly: (i) unlocking the lock and moving the lock to a fully open and unlocked position; (ii) moving the sash as far open as possible to find a fully open position of the window; (iii) moving the sash as close to the window frame as possible to find a fully closed position of the window; and (iv) moving the lock to a fully closed and locked position. The processor circuitry of the window operator assembly may be configured to initiate and cause the self-zeroing operation, e.g., each of the above-listed actions via control signals to the relevant motor(s), in response to the event and/or an instruction from the local computing device in response to user selection in the application. During each of the movements, encoder counts associated with the respective motor encoders of the motor and the lock may be collected and stored by the window operator assembly, which are used to subsequently determine positions of the lock and/or window. Further, the strength of the signal sensed by the magnetic sensor in the sash may be measured when the window is nearing and/or at the closed position, and which may be used to calibrate the magnetic sensor and/or assess and/or determine when the window is closed and/or when the lock is locked. In various embodiments, when the window or lock is in the fully closed position, the window operator assembly may cause the respective motor to push hard to fully close the window and/or lock. Fully closed and fully open, as well as fully closed position and fully open position, includes or refers to the most extreme mechanical position of the window or lock when closed, open, locked, and/or unlocked.

In some embodiments, the self-zeroing operation may further include relaxing the closed position of the window, the open position of the window, the locked position of the lock, and/or the unlocked positon of the lock. For example, the window operator assembly may reduce the number of encoder counts for the window, the open position of the window, the locked position of the lock, and/or the unlocked positon of the lock from the fully open, fully closed, fully locked, and/or fully unlocked position encoder counts, such that the pressure on the components is relaxed in operation and the power operator of the motor is backed off from the full positions. The reduced number of encoder counts, which backs up the open, closed, locked, and/or unlocked positions from the full positions can include between $\frac{2}{10}$ths of one percent and two percent.

More particularly, for the fully open position of the window and the locked and unlocked positions of the lock, the encoder counts may be reduced from the fully open, the fully locked, and the fully unlocked positions. For the fully closed position of the window, the window may be pushed to the fully closed position until the lock is in the locked position. Once the lock is engaged with the keepers, the motor may be backed-off to reduce stress, such as turning the motor backward from the fully closed position by $\frac{2}{10}$ths of one percent and two percent.

In some embodiments, the computing device 440 may operate the application which is used to provide a process for setting up a window and/or for configuring wireless communication associated with the first wireless communication system by the window(s), such as Wi-Fi.

Figure 4C:
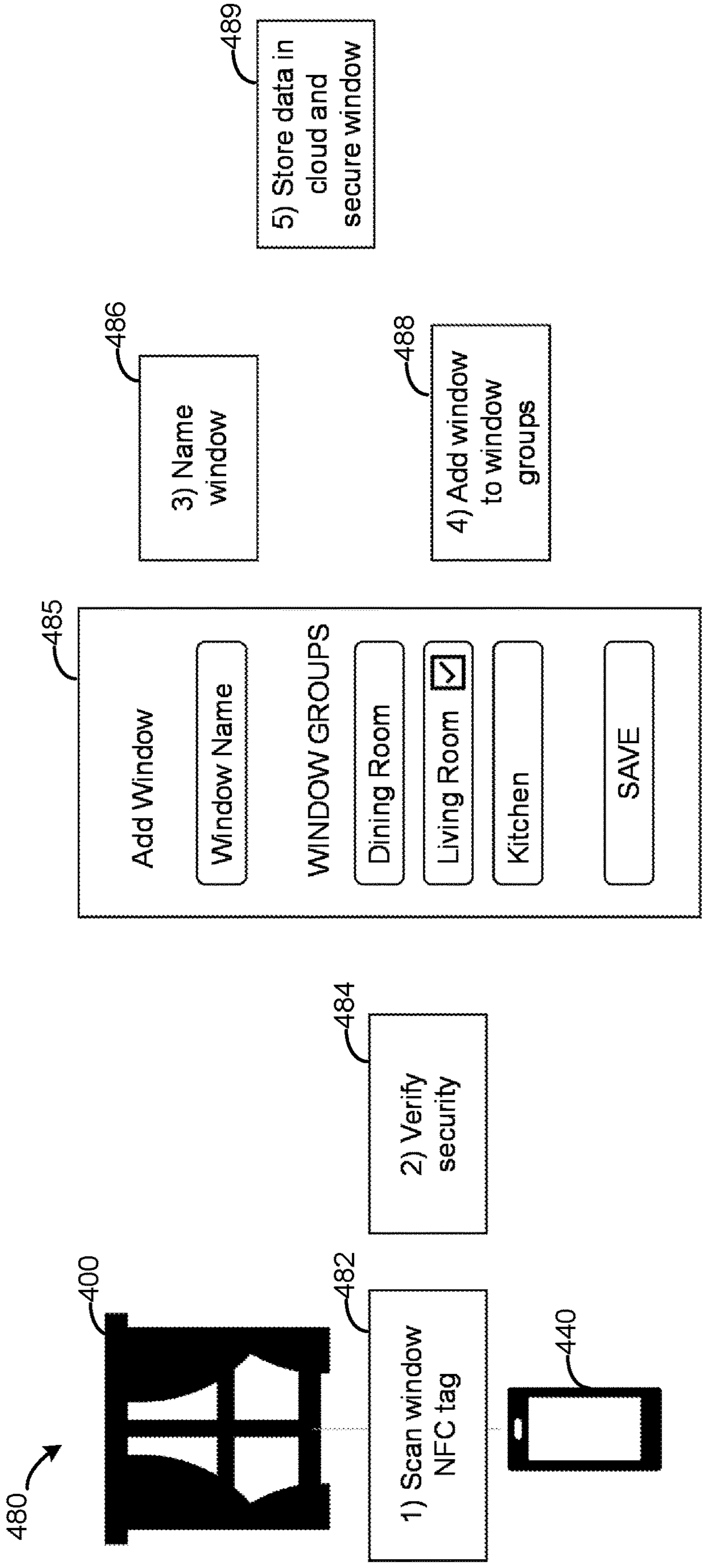

FIG. 4C illustrates an example flow for setting up a window using the application. The application may instruct the user to perform each of the actions, such as via display of a GUI on the computing device 440 of FIGS. 4A-4B. For example, the application may include a wizard that walks the user through the actions. First, at 482, the application instructs the user to scan the tag on the window 400 using the computing device 440, such as a NFC tag. At 484, the application than verifies security by identifying the window ID associated with the tag and checking a database to verify the window ID is not already associated with a building ID and/or to identify the building ID associated with the user of the application based on user log-in information provided when signing into the application. The security verification may be performed by the computing device 440 communicating with a remotely-located device, such as via a cloud computing system, as previously described in connection to FIG. 3. After verifying security, the application displays a GUI 485 to add the window. The display may include boxes for the user to input different information, such as a window name which is input and input or selection of already created window groups of the building to add the window to. In response to the user inputs, at 486 and 488, the application names the window and, optionally, adds the window to the window group(s). The data input to add the window is then provided to the remotely-located device to store and to secure the window, at 489, by the application, such as to a cloud-based database.

Figure 4D:
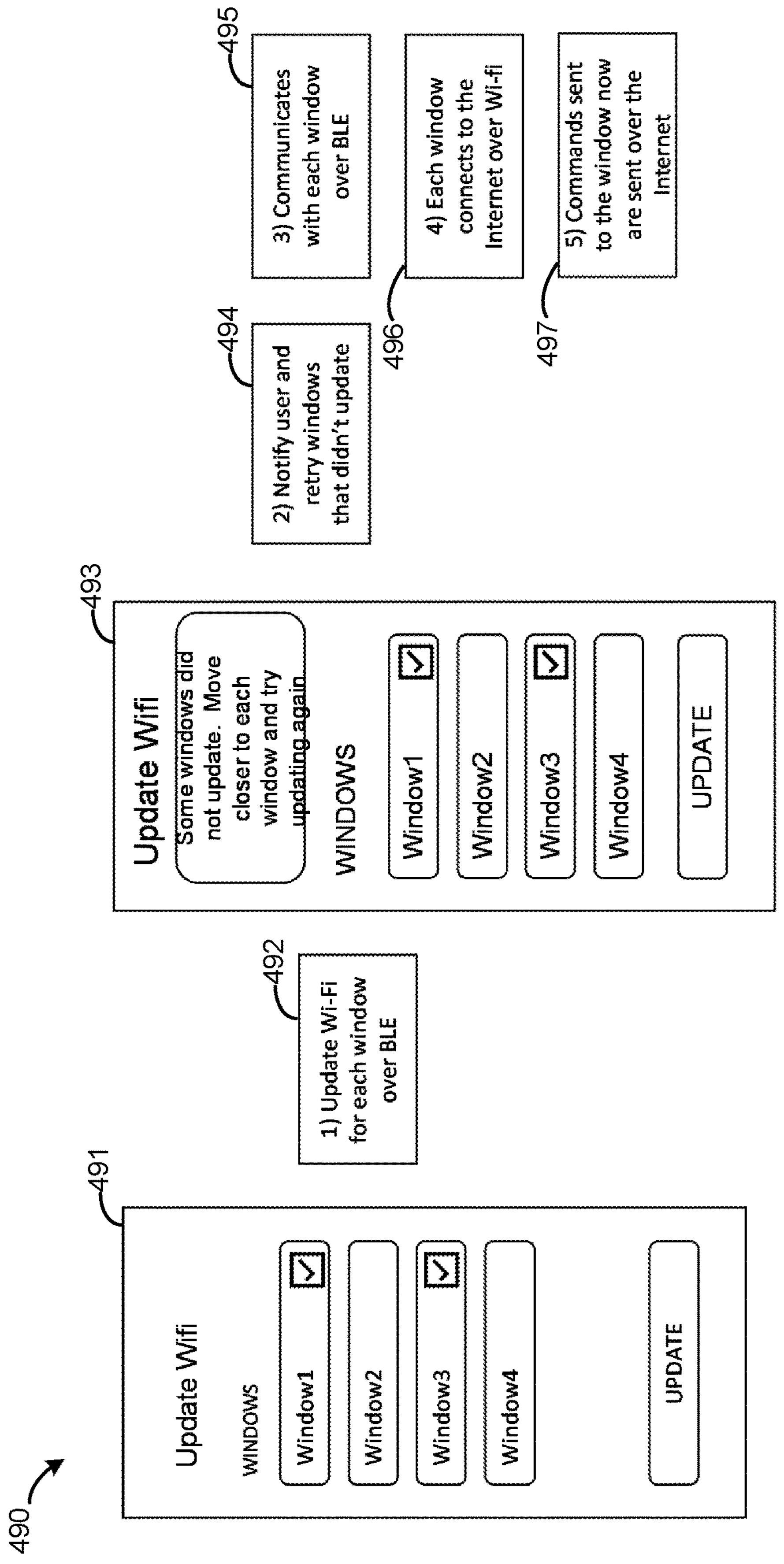

FIG. 4D illustrates an example flow 490 for configuring window(s) of a building for wireless communication associated with the first wireless communication system using the application. The application may instruct the user to perform each of the actions, such as via display of a GUI on the computing device 440 of FIGS. 4A-4B. First, the application displays a GUI 491 to update the wireless communication, e.g., WiFi. The GUI 491 may include boxes for the user to input different information, such as for input or selection of windows of the building and/or groups of windows and an icon to initiate the update over the second wireless communication system (e.g., Bluetooth). In various embodiments, the application may provide an additional GUI screen for the user to input credentials for the first wireless communication system (e.g., name or identification of the network and password). In response to the user selecting windows and initiating the update by selecting the icon, at 492, the computing device 440 communicates instructions to update the Wi-Fi to selected windows and the selected windows communicate back confirmation of successful update via the second wireless communication system. In response to not receiving confirmation from one or more of the selected windows within a threshold period of time, the application displays another GUI 493 that indicates failure of a window to update, and instructs the user to move closer to each selected window and try the update again, at 494. As shown, the communication is to each selected window over the second wireless communication system, at 495, and in response, the windows connects to the Internet over the first wireless communication system and subsequent commands sent to the window are then sent over the Internet via the first wireless communication system, at 496 and 497.

As previously described, the window operator assembly and/or window assembly may include one or more sensors. In some embodiments, the processor circuitry 442 may provide a notification of a sensor alert in response to communication from the window operator assembly caused by a sensor signal from a respective sensor (e.g., rain sensor triggered and window closed, Wi-Fi lost and window closed, errors, motion sensor or motor sensors manual movement, glass break sensors, CO sensor, temperature sensors).

In some embodiments, the computing device 440 may be used to update a wireless network setting for all windows of the building. For example, the processor circuitry 442 may instruct the user to scan a window ID on the window operator assembly in response to loss connection of a wireless communication and, in response to the scan, identify a plurality of window operator assemblies associated with the building ID and update each of the plurality of window operator assemblies to a new communication setting including the use of a new wireless communication system for wireless communications. The instruction may occur in response to the connection loss and/or notification by the user of a new wireless communication system. The configuration information for a home may be stored remotely, such as being stored by the cloud computing system, e.g., stored in the cloud (e.g., a cloud-based database). Therefore, scanning any window in that building (e.g., a house) can allow access to the information for all windows associated with that building.

Figure 5A:
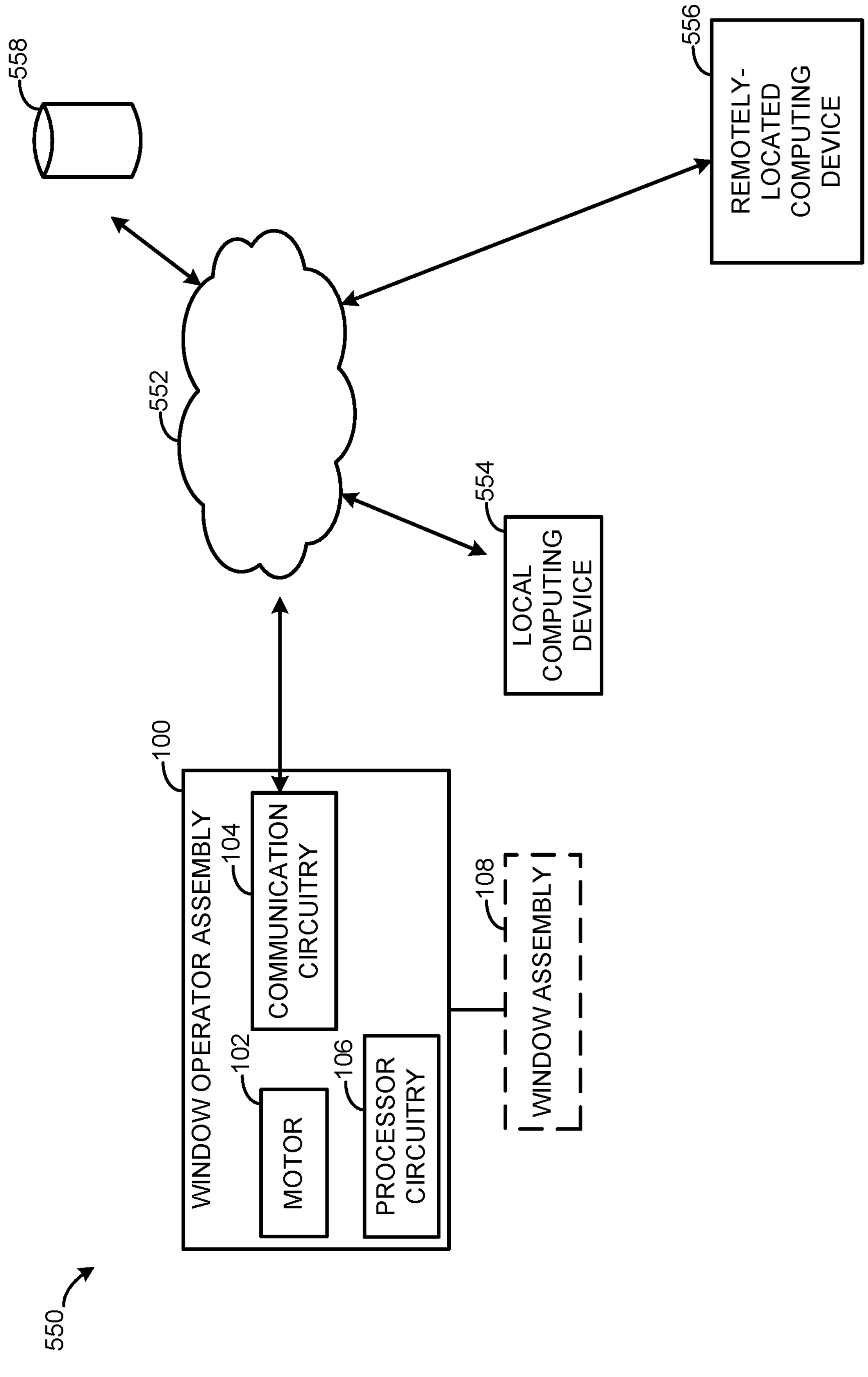
FIGS. 5A-5C illustrate example window systems, in accordance with examples of the present disclosure.
Figure 5B:
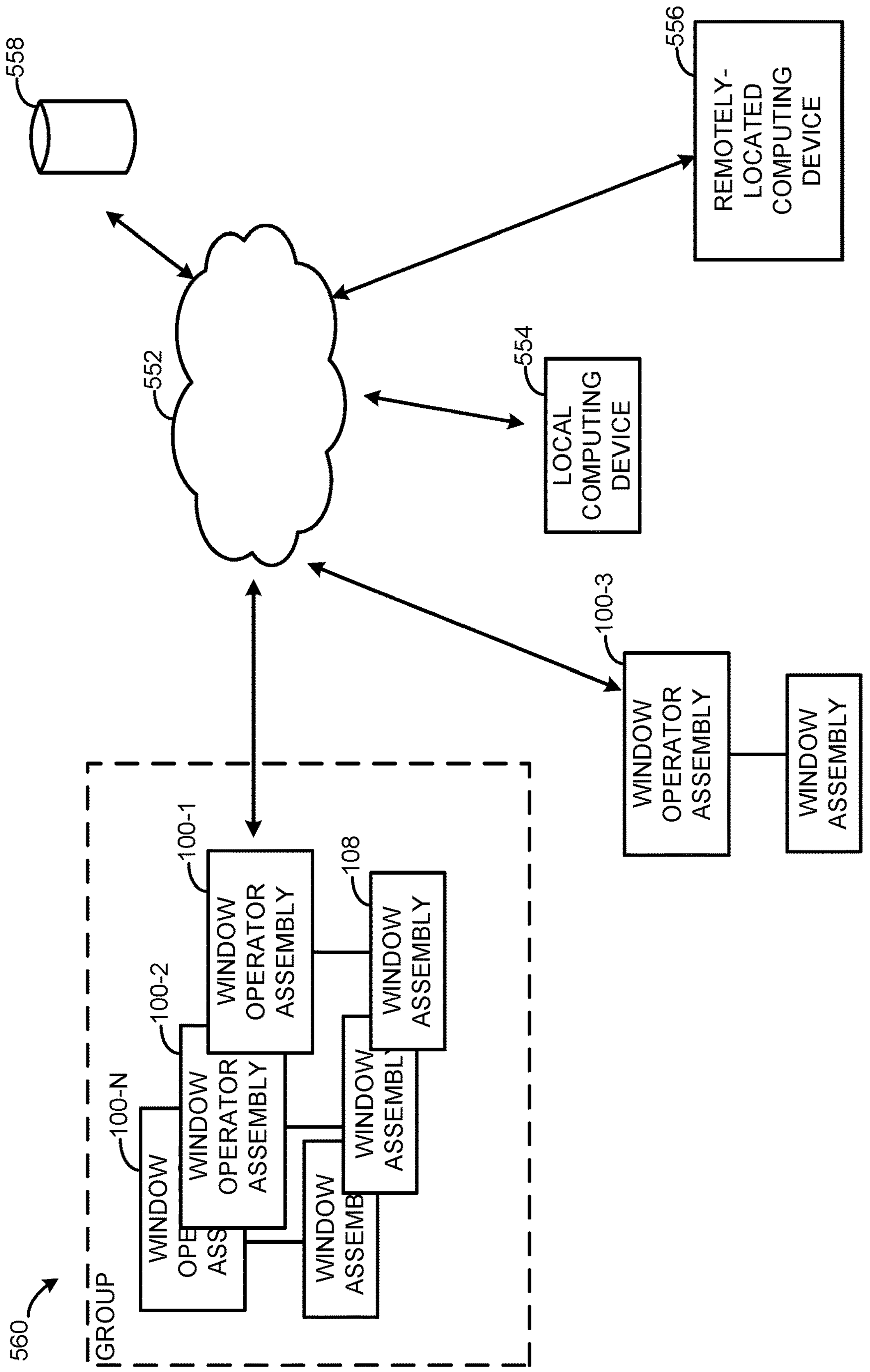
Figure 5C:
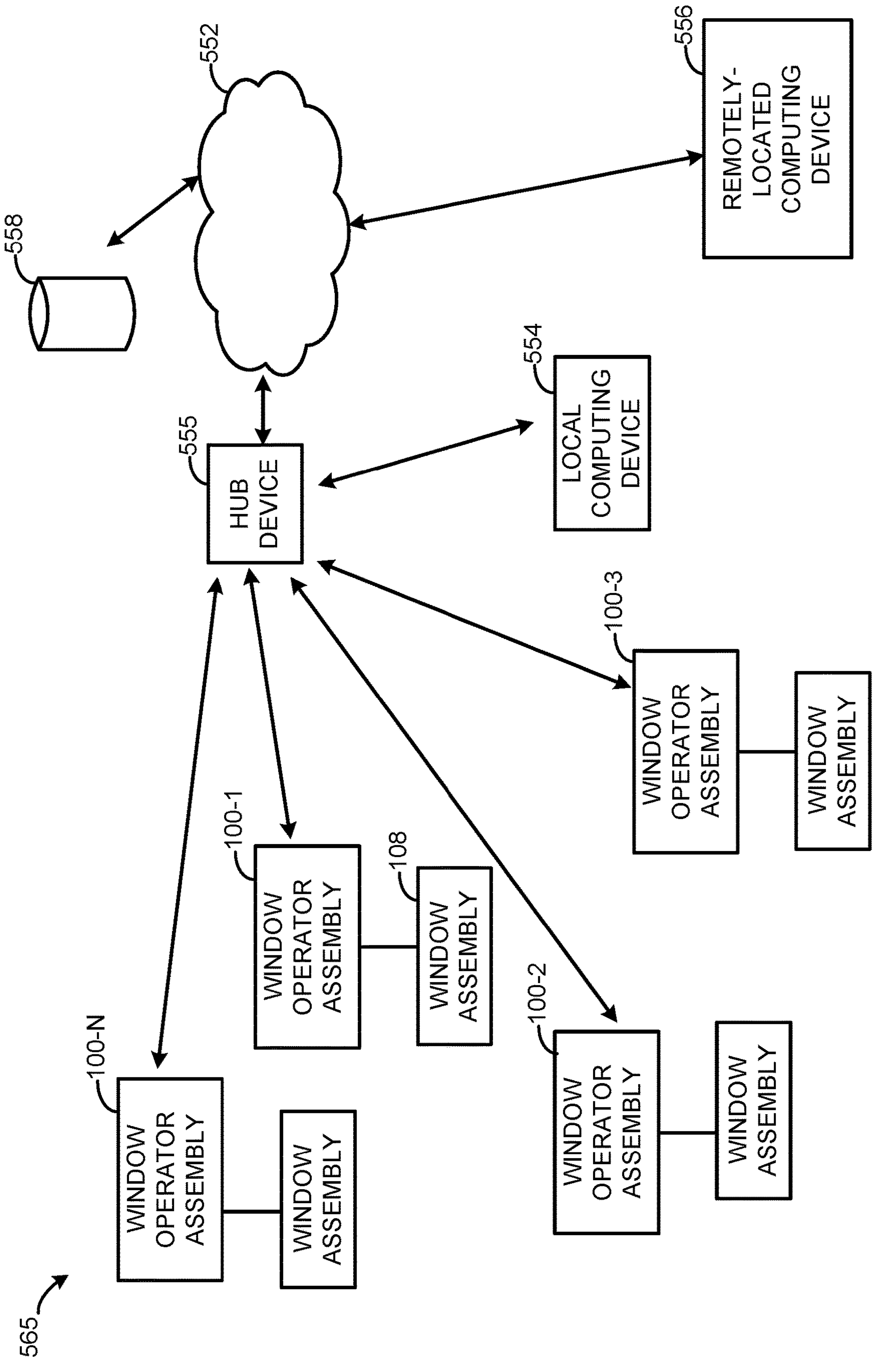

FIGS. 5A-5C illustrate example window systems, in accordance with the principles of the present invention. The example window systems 550, 560, 565 may be implemented over or form part of a cloud computing system in some example embodiments as previously described.

As shown by FIG. 5A, the example window system 550 includes a window operator assembly 100 as previously described by FIG. 1, a local computing device 554, and a remotely-located computing device 556. The local computing device 554 may include the computing device 440 as previously described by FIG. 4A-4B. The remotely-located computing device 556 may include the computing device 330 as previously described by FIG. 3. The devices 100, 554, 556 of the system 550 may communicate over a network 552, such as using wireless communications with a wireless communication system (e.g., Wi-Fi) as previously described. In some embodiments, different devices, such as the window operator assembly 100 and local computing device 554 may be configured to communicate using different types of wireless communications and wireless communication systems (e.g., Wi-Fi and Bluetooth).

The window operator assembly 100 is connected to a window of a building, such as a window forming part of the window assembly 108 as illustrated by FIG. 5A. As previously described by FIG. 1 and FIGS. 2A-2B, the window operator assembly 100 includes a motor 102 coupled to components of the window, and the processor circuitry 106 is coupled to the motor 102 and configured to control the motor 102 and control a state (e.g., a position) of the window. The window operator assembly 100 may further include communication circuitry 104. Although one window operator assembly 100 is illustrated, the window system 550 may include a plurality of window operator assemblies, as further illustrated by the window system 560 of FIG. 5B.

In various embodiments, the communication circuitry 104 may provide a first type and a second type of wireless communications with a first wireless communication system and a second wireless communication system. In such embodiments, the processor circuitry 106 may identify connection loss between the communication circuitry 104 and the first wireless communication system, and in response, cause the communication circuitry 104 to switch to the second wireless communication system and to cause the window operator assembly 100 to perform an action, such as moving to a closed position and/or communicating the lost connection to the local computing device 554.

The local computing device 554 may identify a window ID associated with the window operator assembly 100, identify a building ID to associate with the window ID based on a user input, wirelessly communicate the window ID and the building ID to the remotely-located computing device 556, and wirelessly communicate with the processor circuitry 106 of the window operator assembly 100 to control a state of the window. As previously described, the local computing device 554 may include a display, and may provide a GUI and control the state of the window by communicating a message to the processor circuitry 106 indicative of at least one of a direction of movement of the window, a position of the window, and a speed of the movement of the window in response to user input(s) to the GUI.

The remotely-located computing device 556 may assign the window ID with the building ID in a database 558, and control changes to the assignment of the window ID to the building ID in the database 558 based on a set of rules. In some embodiments, the remotely-located computing device 556 includes a plurality of distributed computing devices used to provide a backend service, such as registering windows, buildings and associations between the same. The plurality of distributed computing devices may include servers and/or databases that form part of a cloud computing system. The remotely-located computing device 556 and/or portions thereof (e.g., the processor circuitry and memory circuitry) may form part of the plurality of distributed computing devices to provide the back-end service.

FIG. 5B illustrates another example window system 560 which includes a plurality of window operator assemblies 100-1, 100-2, 100-3, 100-N, and the same components 552, 554, 556, 558 as previously described by the window system 550 of FIG. 5A and as illustrated by the similar numbering, the details of which are not repeated. More particularly, the window system 560 illustrates an example of forming a group of windows (e.g., window operator assemblies 100-1, 100-2, 100-N) by the local computing device 554. After forming the group, the local computing device 554 may control positions of each window of the group simultaneously via an input the GUI of the local computing device 554 associated with an icon of the group, as previously described.

FIG. 5C illustrates another example window system 565 which includes a plurality of window operator assemblies 100-1, 100-2, 100-3, 100-N, and the same components 552, 554, 556, 558 as previously described by the window system 560 of FIG. 5B, the details of which are not repeated. Although not illustrated by FIG. 5C, respective subsets of the plurality of window operator assemblies 100-1, 100-2, 100-3, 100-N may be formed into group(s), as previously illustrated by FIG. 5B.

More particularly, the window system 565 illustrates an example system that further includes a hub device 555 which locally communicates using a local communication system or network with the plurality of window operator assemblies 100-1, 100-2, 100-3, 100-N and, optionally the local computing device 554. The hub device 555 may communicate over the network 552, such as to the cloud computing system and/or to the remotely-located computing device 556. In such embodiments, the plurality of window operator assemblies 100-1, 100-2, 100-3, 100-N, and optionally the local computing device 554 may not communicate with the cloud computing system and/or over the network 552. As a single hub device 555 is used to communicate with the cloud computing system, service costs with the cloud computing system may be reduced and/or the set-up of the system 565 may be simplified as compared to all devices communicating over the network 552. Further, similar to the building ID, the set-up of the system 565 may be tied to a device ID of the hub device 555, such as associating window IDs with the device ID of the hub device 555, and there may be similar restrictions on removing the association and/or allowing user control as previously described in connection to the building ID.

The hub device may include a physical layer networking device which is used to connect multiple device in the system 565 to the network 552. In some embodiments, the hub device 555 can communicate with the plurality of window operator assemblies 100-1, 100-2, 100-3, 100-N, and optionally the local computing device 554, using a local area network (LAN). The hub device 555 may include processor circuitry, memory circuitry, and communication circuitry, similar to that previously described by the local computing device. Although one hub device 555 is illustrated by FIG. 5C, a building may include a plurality of hub devices which are located in different zones of the building.

Figure 6:
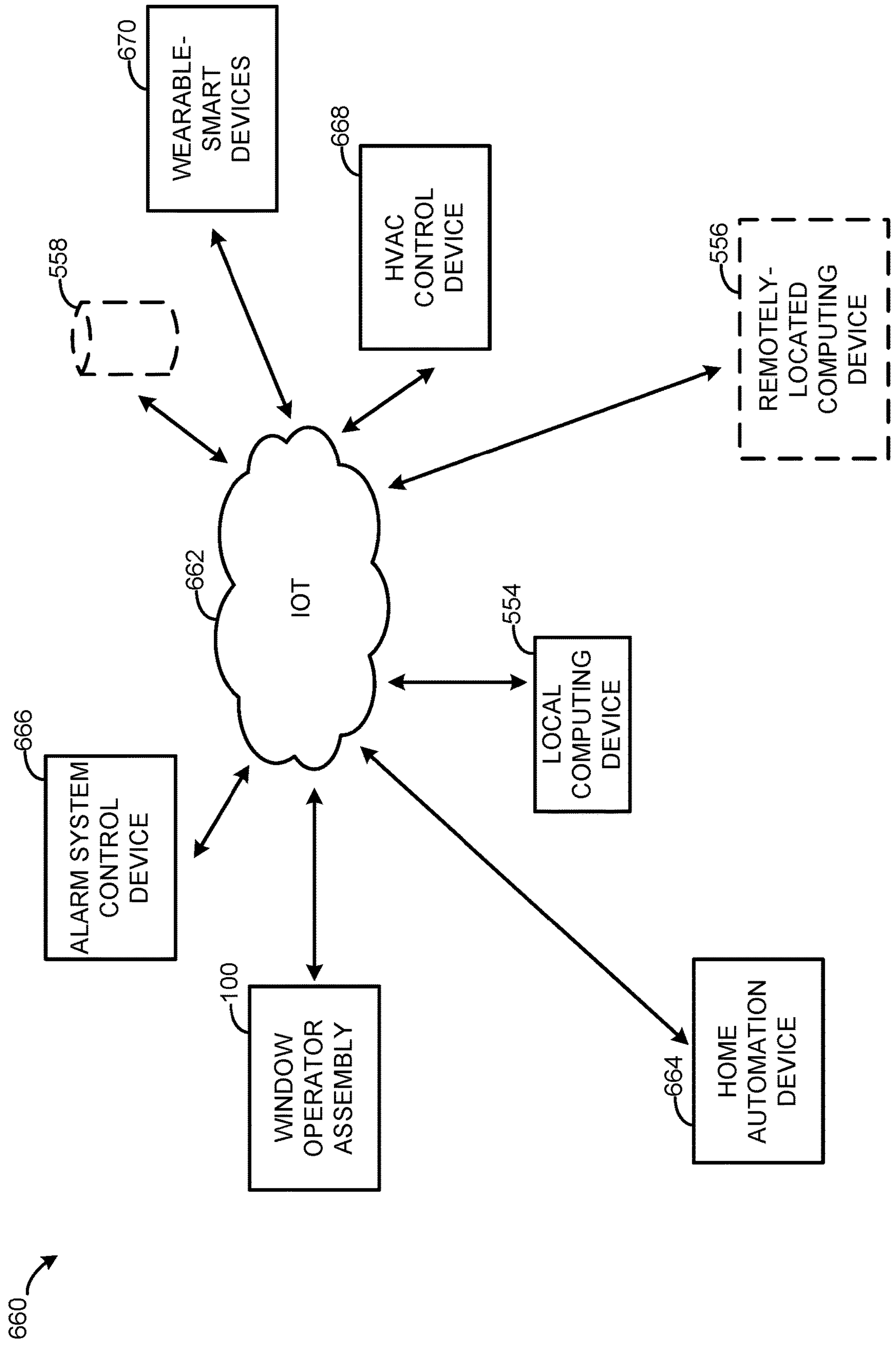
FIG. 6 illustrates an example internet of things (IOT) system including a window operator assembly as shown in FIG. 1, in accordance with examples of the present disclosure.

FIG. 6 illustrates an example IOT system including a window operator assembly as shown in FIG. 1, in accordance with the principles of the present invention. The IOT system 660 includes a plurality of wireless communication devices 100, 554, 556, 664, 666, 668, 670 which communicate over a network 662 via a first wireless communication systems. In some embodiments, the IOT system 660 includes the remotely-located computing device 556 which may be in communication with the local computing device 554, as previously described. Although not illustrated, the IOT system 660 can include one or more hub devices used to locally communicate with the different plurality of wireless communication devices 100, 554, 556, 664, 666, 668, 670 and in which the hub device(s) communicate over the network 662, as previously described by FIG. 5C.

The plurality of wireless communication devices 100, 554, 556, 664, 666, 668, 670 include a window operator assembly 100 and the local computing device 554. The window operator assembly 100 is connected to a window and configured to adjust a state of the window, such as a position and/or locking or unlocking the window. The local computing device 554 can run an application to control the state of the window, e.g., via communication with the window operator assembly 100. In various embodiments, for security and/or other purposes, at least some of the control of the window may be local to the window operator assembly 100 and/or occur independent of communication with the local computing device 554. As some non-limiting examples, the window operator assembly 100 may automatically cause the window to close, without an instruction from the local computing device 554, in response to detection or other indication of rain and/or loss of wireless communication connection, among others.

The IOT system 660 may include other wireless communication devices located in or proximal to the building. Example wireless communication devices include an alarm system control device 666, an HVAC control device 668, a home automatic device 664, a wearable smart device 670, and other smart devices, such as weather devices, smart appliances (e.g., ovens, refrigerators, grills, faucets), and exercise machines.

In some embodiments, the IOT system 660 includes an alarm system control device 666. The alarm system control device 666 may control operations of an alarm system for the building. The alarm system control device 666 may communicate with the window operator assembly 100 and/or local computing device 554 to provide information associated with states of the windows and/or the alarm system for the building. For example, the communication may prevent activation of the alarm system when a window of the building is in an open position and/or is unlocked. In some embodiments, the alarm system control device 666 or the local computing device 554 may provide a notification to the user, via a display, noting the alarm system is not activated and/or is prevented from activating due to the state of the window and identifying the window. As a specific example, the alarm system control device 666 and local computing device 554 may be in communication with one another. In response to a user setting the alarm system to be on or activated, the alarm system control device 666 may send a message to the local computing device 554 to identify a state of the windows in the building. The local computing device 554 may identify that a window and/or a group of windows are in an open position, and communicate a message back to the alarm system control device 666 notifying the alarm system control device 666 of the open window(s). In response, the alarm system control device 666 may deny setting the alarm system to the on or activated state and may display a message on the display of the alarm system control device 666 notifying the user of the denial and/or identifying the window(s) in the open position. In some embodiments, the message may direct the user to access the local computing device 554 to close the window(s). Alternatively and/or in addition, the local computing device 554 may provide an alert to the user that notifies the user of the denial of setting the alarm system in the activated state due to the window(s) being open. The alert may prompt the user to close the window(s).

In some embodiments, the TOT system 660 includes an HVAC control device 668 and a plurality of window operator assemblies each connected to respective windows. The HVAC control device 668 may control operation of components of an HVAC system, such as a furnace, a heat exchanger, an air conditioner, a fan, and a thermostat, among other components. The HVAC control device 668 may communicate with the window operator assembly 100 and/or the local computing device 554 to provide information associated with states of the windows for the building. The communication may be used to create positive air pressure in the building for purposes of flushing air within the building. For example, the local computing device 554 may control or direct opening of a subset of the plurality of windows via communication with the plurality of window operator assemblies, closing of the remaining plurality of windows via the communication with the plurality of window operator assemblies, and activation of the HVAC system via communication with the HVAC control device 668 to create positive air pressure (e.g., shut-off cold air returns) and allow for outside (fresh) air to replace the old and potentially contaminated air being expelled. The positive air pressure may be used to push current (stale) air out of the building and pull new (fresh) air into the building. In other embodiments, the HVAC control device 668 may control the process by communicating with the local computing device 554 and activating the HVAC system in response to confirmation from the local computing device 554 of the subset of the plurality of windows being in the open position and the remaining being in the closed position.

In some embodiments, the positive air pressure may be used to evacuate contaminated air and/or to provide protection from contaminates in the air, such as for viruses. As a specific example, the positive air pressure may be used to provide fresh air in the building or a portion of the building to improve the air quality and reduce viral contaminates in the air. In some embodiments, the risk of exposure to a coronavirus, such as COVID-19, may be reduced by the positive air pressure. For example, a subset of windows in the building, associated with a location (e., room(s)) that users are to be located in, may be opened and the HVAC control device 668 creates positive air pressure in the location. As a specific example, a user may have visitors to their home and may select which room or rooms of their home that they will be located in and for an amount of time. A subset of the windows of the home associated with the selected room(s) may be opened and fresh air may be pulled in while current air is pushed out for the entire time that the visitors are present in the user's home. The selective activation in the selected room(s) of the home allows for targeted location of the positive air pressure that occurs automatically, rather than being applied in the entire home and without requiring the user to walk around the home and manually open windows.

In some embodiments, the IOT system 660 includes a home automation device 664. A home automation device 664 may receive human voice commands, translate the voice commands, and provide an operation in response to the translated voice commands, such as an Alexa, Siri, or Google Assistant-based device. The home automation device 664 may communicate with the window operator assembly 100 and/or the local computing device 554. For example, the home automation device 664 may receive a voice command from a user and, in response, direct the window operator assembly 100 to control a state of the window. The communication may be provided directly to the window operator assembly 100 or to the local computing device 554 which controls the window operator assembly 100. In some embodiments, the home automation device 664, the window operator assembly 100, and/or the local computing device 554 authorize the voice command and/or the control of the position of the window in response to a verification factor from a user approved device and/or a user approved device being within a threshold distance. In some embodiments, the verification includes a 2-step verification process. For example, the verification factor may be provided by local computing device 554 and/or a wearable smart device 670 after prompting the user to verify the authorization by the local computing device 554 and/or the wearable smart device 670.

As noted above, the TOT system 660 may include other devices, such as devices that provide weather information, information on the state of the building (e.g., an oven is on, which may impact a temperature), smart lights, sensors, irrigation controllers, drapery or blind controllers among other information that may be used by devices of the TOT system 660 to adjust operations. For example, using weather information, the local computing device 554 may automatically direct windows to be in different states and/or may suggest the windows be in the different states to the user. As an example, a weather application running on the local computing device 554 and/or the wearable smart device 670 may indicate that a thunderstorm is approaching and cause the windows in the building to close. As another example, a smart oven may notify the local computing device 554 of the oven being on and at a particular temperature, and along with information on the weather, notification of the setting of the HVAC system and/or settings by a user, the local computing device 554 may change the position of one or more windows, such as opening the windows in response to the HVAC being off, the temperature in the building going above a threshold temperature, and the temperature outside being near or below the threshold temperature.

Various embodiments are implemented in accordance with the underlying Provisional Application (Ser. No. 63/319,242), entitled "WINDOW OPERATOR ASSEMBLIES AND DEVICES FOR CONTROLLING THE SAME," filed Mar. 11, 2022, to which benefit is claimed and which is fully incorporated herein by reference for its general and specific teachings. For instance, embodiments herein and/or in the provisional application can be combined in varying degrees (including wholly). Embodiments discussed in the Provisional Application are not intended, in any way, to be limiting to the overall technical disclosure, or to any part of the claimed disclosure unless specifically noted.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "includes", "including", "comprises", and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and can be abbreviated as "/".

Although various illustrative embodiments are described above, any of a number of changes can be made to various embodiments without departing from the scope of the invention as described by the claims. For example, although described or shown with respect to one embodiment, the features and elements so described or shown can apply to other embodiments. As a further example, the order in which various described method steps are performed can often be changed in alternative embodiments, and in other alternative embodiments one or more method steps can be skipped altogether. Optional features of various device and system embodiments can be included in some embodiments and not in others. Therefore, the foregoing description is provided primarily for exemplary purposes and should not be interpreted to limit the scope of the invention as it is set forth in the claims.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which can be illustrated as or using terms such as blocks, modules, device, system, unit, controller, and/or other circuit-type depictions. Such circuits or circuitry are used together with other elements to exemplify how certain embodiments can be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in the figures. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Various embodiments described above, may be implemented together and/or in other manners. One or more of the items depicted in the present disclosure can also be implemented separately or in a more integrated manner, or removed and/or rendered as inoperable in certain cases, as is useful in accordance with particular applications. In view of the description herein, those skilled in the art will recognize that many changes may be made thereto without departing from the spirit and scope of the present disclosure.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A window operator assembly comprising:

a motor;

communication circuitry configured to provide a first type of wireless communications and a second type of wireless communication with a first wireless communication system and a second wireless communication system, the communication circuitry of the window operator assembly including telemetry components according to wireless protocols associated with the first wireless communication system and the second wireless communication system; and processor circuitry configured to:

identify connection loss between the communication circuitry and the first wireless communication system; and in response to the connection loss between the communication circuitry and the first wireless communication system;

automatically cause the communication circuitry to switch to the second wireless communication system and the window operator assembly to perform an action without receiving an instruction from external circuitry, the action including activating the motor to move a sash of a window assembly to a closed position and to cause the window assembly to lock in the closed position and cause the communication circuitry to switch to the second wireless communication system, wherein the window operator assembly is configured to connect to the sash of the window assembly; and communicate a message to the external circuitry using the second wireless communication system, wherein the message notifies a user of a connection loss of the first wireless communication system, the window assembly being in the closed position and locked, and a prompt to verify the window assembly is to be placed in the closed position or approval to reposition the window assembly to an open position.

2. The window operator assembly of claim 1, wherein the connection loss causes loss of direct control of operation of the window operator assembly by the external circuitry via communications over the first wireless communication system and wherein the window operator assembly further includes a lock motor assembly including a motor associated with a lock and the lock including a lock bar configured to couple to a window frame of the window assembly and keepers configured to couple to the sash, and the action performed includes the processor circuitry activating the motor associated with the lock to move the lock into the closed position via the lock bar engaging with the keepers.

3. The window operator assembly of claim 1, wherein the first type of wireless communication is cloud-based and the second type of wireless communication is a direct communication.

4. The window operator assembly of claim 1, further including a window identifier (ID) that identifies the window operator assembly and the window assembly including the sash connected to the window operator assembly.

5. The window operator assembly of claim 1, wherein the processor circuitry is configured to cause the communication circuitry to switch to the second wireless communication system and to connect to a third wireless communication system associated with the first type of wireless communication.

6. The window operator assembly of claim 1, wherein the processor circuitry is configured to activate the motor to move the sash of the window assembly to a position and at a set speed based on communication from a computing device.

7. The window operator assembly of claim 6, wherein the processor circuitry is configured control the set speed based on a pulse width modulation (PWM) of the motor.

8. The window operator assembly of claim 1, wherein the communication circuitry cannot provide the first type of wireless communication with the first wireless communication system in response to the connection loss between the communication circuitry of the window operator assembly and the first wireless communication system, and the processor circuitry is configured to provide motor movement at a constant speed based on feedback data from a motor encoder coupled to the motor.

9. The window operator assembly of claim 1, further including a pressure sensor in communication with the processor circuitry, wherein the processor circuitry is configured to stop movement of the sash of the window assembly in response to a sensor signal from the pressure sensor indicating the movement is slower than a threshold speed.

10. The window operator assembly of claim 1, further including at least one of:

a liquid sensor in communication with the processor circuitry, wherein the processor circuitry is configured to close the sash of the window assembly in response to a sensor signal from the liquid sensor indicating occurrence of rain; and a glass break sensor in communication with the processor circuitry, wherein the processor circuitry is configured to communicate an alert in response a sensor signal from the glass break sensor indicating a glass pane of the window assembly is broken.

11. The window operator assembly of claim 1, further including a motion sensor in communication with the processor circuitry, wherein the processor circuitry is configured to communicate an alert in response a sensor signal from the motion sensor indicating the sash of the window assembly is being manually moved.

12. The window operator assembly of claim 1, further including a magnetic sensor in communication with the processor circuitry and a magnet, wherein the processor circuitry is configured to identify a position of the sash from a plurality of positions based on sensor signals from the magnetic sensor as the magnetic sensor interacts with the magnet, wherein the sash is pivotally mounted to a window frame of the window assembly and coupled to an elongate member of the window frame, and the motor is configured to couple to the elongate member and cause the sash to pivot relative to the window frame to the plurality of positions and thereby move a window of the window assembly to different window positions including an open position, a closed position, and any position between the open position and the closed position, and the sensor signals from the magnetic sensor are different strengths when the window is in the different window positions.

13. The window operator assembly of claim 1, wherein the sash is pivotally mounted to a window frame of the window assembly and coupled to an elongate member of the window frame, and the motor is configured to couple to the elongate member and cause the sash to pivot relative to the window frame to a plurality of different positions including an open position, a closed position, and any position between the open position and the closed position, and thereby move a window of the window assembly to different window positions, and the processor circuitry is further configured to initiate a self-zeroing operation associated with the window assembly including the sash connected to the window operator assembly, wherein the self-zeroing operation includes the window operating assembly:

causing the sash to move between the open position and the closed position;

causing a lock of the window assembly to move between an unlocked position and a locked position; and collecting and storing encoder counts indicative of movements of the motor and a motor associated with the lock at the open position, the closed position, the unlocked position, and the locked position.

14. The window operator assembly of claim 1, wherein the connection loss includes an Internet connection loss due to a network failure, and in response to the connection loss, the processor circuitry is further configured to communicate a message to the external circuitry using the second wireless communication system.

15. The window operator assembly of claim 2, wherein the action further includes:

communicating a message, via the communication circuitry and using the first or second type of wireless communications, to a wireless communication device, the message being indicative of the connection loss; and verifying an approved wireless communication device is connected to the second wireless communication system and is within a threshold range of the window operator assembly.

16. The window operator assembly of claim 13, wherein the processor circuitry is configured to, automatically and without user input, initiate the self-zeroing operation in response to an event, wherein the event includes an error or a sensor signal indicating a break-in attempt.

17. The window operator assembly of claim 13, wherein the self-zeroing operation further includes collecting and recording a sensor signal of a magnetic sensor while the sash is in the closed position, wherein one of the magnetic sensor and a magnet are located on a window frame of the window assembly and the other is located on the sash, the motor being configured to cause the sash to pivot relative to the window frame to the plurality of different positions and with signals sensed by the magnetic sensor due to interactions with the magnet being different strengths when the sash is in the different positions.

18. A non-transitory computer-readable storage medium comprising instructions that when executed cause processor circuitry to:

receive a window identifier (ID) associated with a window operator assembly and a building ID associated with a building containing a window connected to the window operator assembly;

assign the window ID to the building ID and store the assignment of the window ID to the building ID in a database that includes a plurality of window IDs associated with respective building IDs; and control changes to the assignment of the window ID to the building ID in the database based on a set of rules, wherein the set of rules include:

limiting the window ID to be assigned to only one building ID in the database;

preventing the window ID from being reassigned to a different building ID and from being removed from the building ID in the database;

requiring user ID permission to control the window; and preventing changes to the assignment in the database without user authorized release or a threshold amount of time.

19. The non-transitory computer-readable storage medium of claim 18, wherein the set of rules further include:

limiting changes to the assignment of the window ID to within the building ID, and a time limit for a user ID permitted to control the window ID.

20. The non-transitory computer-readable storage medium of claim 18, further including instructions that when executed, cause the processor circuitry to communicate a plurality of use rules to a local computing device, the plurality of use rules including:

close and lock the window in response to a connection loss of the window operator assembly with a first wireless communication system;

switch to communicating a second type of wireless communications with the window operator assembly using a second wireless communication system in response to the connection loss with the first wireless communication system; and close and lock the window in response to use of the second wireless communication system and an approved wireless communication device being out of range.

21. A non-transitory computer-readable storage medium comprising instructions that when executed cause processor circuitry to:

physically scan a portion of a window operator assembly connected to a window of a building to obtain a window identifier (ID) associated with a tag on the window operator assembly;

identify an associated building ID;

communicate the window ID and the building ID to a remotely-located computing device;

establish wireless communication with the window operator assembly using a first wireless communication system; and control access to the window operator assembly based on a set of rules obtained from the remotely-located computing device, wherein the set of rules include:

limiting the window ID to be assigned to only one building ID as stored in a database, wherein the database includes a plurality of window IDs associated with respective building IDs;

preventing the window ID from be reassigned to a different building ID and from being removed from the building ID in the database;

requiring user ID permission to control the window; and preventing changes to the assignment in the database without user authorized release or a threshold amount of time.

22. The non-transitory computer-readable storage medium of claim 21, further including instructions that when executed, cause the processor circuitry to group the window ID with other window IDs, and communicate a message to the group to at least one of simultaneously and concurrently control a position of each associated windows regardless of a starting position of each of the associated windows.

23. The non-transitory computer-readable storage medium of claim 21, further including instructions that when executed, cause the processor circuitry to provide a graphical user interface (GUI) indicating an alert in response to communication from the window operator assembly indicative of at least one of:

loss of connection to the first wireless communication system;

an approved wireless communication device out of range;

the window being closed and locked in response to event;

an error;

a sensor event; and a communication attempt with non-authorized devices.

* * * * *